United States Patent
Leaf et al.

(10) Patent No.: US 12,431,991 B2
(45) Date of Patent: *Sep. 30, 2025

(54) ANTENNA AND ENVIRONMENTAL CONDITIONS MONITORING FOR WIRELESS AND TELECOMMUNICATIONS FOR PRIVATE, PUBLIC, FIRST RESPONDERS, AND EMERGENCY RESPONDER RADIO COMMUNICATION SYSTEM (ERRCS)

(71) Applicant: Gugli Corporation, Sheridan, WY (US)

(72) Inventors: Frederick Daniel Leaf, San Clemente, CA (US); Joshua Travis Helling, Mission Viejo, CA (US)

(73) Assignee: Gugli Corporation, Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,179

(22) Filed: Jun. 26, 2024

(65) Prior Publication Data

US 2024/0430019 A1     Dec. 26, 2024

Related U.S. Application Data

(63) Continuation of application No. 18/346,725, filed on Jul. 3, 2023, now Pat. No. 12,028,120, which is a
(Continued)

(51) Int. Cl.
    *H04B 17/17*      (2015.01)
    *H01Q 21/28*      (2006.01)
    (Continued)

(52) U.S. Cl.
    CPC ............. *H04B 17/17* (2015.01); *H01Q 21/28* (2013.01); *H04B 17/12* (2015.01); *H04B 17/16* (2015.01)

(58) Field of Classification Search
    CPC ........ H04B 17/17; H04B 17/16; H04B 17/12; H01Q 21/28
(Continued)

(56) References Cited

U.S. PATENT DOCUMENTS

| | | |
|---|---|---|
| 5,640,151 A | 6/1997 | Reis |
| 6,114,955 A | 9/2000 | Brunius et al. |

(Continued)

FOREIGN PATENT DOCUMENTS

| | | |
|---|---|---|
| CN | 102232310 A | 11/2011 |
| EP | 2765721 | 8/2014 |

(Continued)

OTHER PUBLICATIONS

U.S. Appl. No. 17/946,949, filed Sep. 16, 2022, Fourie.
(Continued)

*Primary Examiner* — Don N Vo
(74) *Attorney, Agent, or Firm* — Knobbe, Martens, Olson & Bear LLP

(57) ABSTRACT

Antenna monitoring systems and methods can include, among other things, a transmitter near each of the antennas in a distributed antenna system (DAS). The transmitter can transmit an antenna identifier corresponding to that antenna, so that the various transmitters in the DAS each transmit different antenna identifiers. These antenna identifiers can be detected by a receiver and can be processed to determine whether any antenna identifiers are missing. If any expected antenna identifier is missing, the receiver can infer that the antenna or a component associated with the antenna (such as cabling) may have failed. The receiver can then output an indication or notification that may be accessed by maintenance personnel and/or emergency personnel to enable them to identify and repair the non-functioning antenna or component. The transmitter can transmit other data, such as
(Continued)

environmental data, RF data, or the like, to facilitate additional or alternative monitoring functionality.

21 Claims, 15 Drawing Sheets

Related U.S. Application Data continuation of application No. 18/156,963, filed on Jan. 19, 2023, now Pat. No. 11,736,208, which is a continuation-in-part of application No. 17/822,670, filed on Aug. 26, 2022, now abandoned, which is a continuation of application No. 17/226,939, filed on Apr. 9, 2021, now Pat. No. 11,438,080, which is a continuation of application No. 15/931,391, filed on May 13, 2020, now Pat. No. 10,979,155, which is a continuation-in-part of application No. 16/816,724, filed on Mar. 12, 2020, now abandoned, which is a continuation of application No. 16/408,921, filed on May 10, 2019, now Pat. No. 10,594,412, which is a continuation of application No. 16/122,629, filed on Sep. 5, 2018, now Pat. No. 10,291,336, said application No. 15/931,391 is a continuation-in-part of application No. PCT/US2019/025018, filed on Mar. 29, 2019, which is a continuation-in-part of application No. 16/122,629, filed on Sep. 5, 2018, now Pat. No. 10,291,336.

(60) Provisional application No. 62/699,155, filed on Jul. 17, 2018.

(51) Int. Cl.
*H04B 17/12* (2015.01)
*H04B 17/16* (2015.01)

(58) Field of Classification Search
USPC .......................................................... 375/224
See application file for complete search history.

(56) References Cited

U.S. PATENT DOCUMENTS

| | | | |
|---|---|---|---|
| 6,222,503 | B1 | 4/2001 | Gietema |
| 6,369,766 | B1 | 4/2002 | Strickland |
| 6,625,428 | B1 | 9/2003 | Finnell et al. |
| 7,224,170 | B2 | 5/2007 | Graham et al. |
| 7,656,858 | B2 | 2/2010 | Campero |
| 8,254,848 | B1 | 8/2012 | Elliott |
| 8,744,390 | B2 | 6/2014 | Stratford |
| 8,831,592 | B2 | 9/2014 | Elliot et al. |
| 8,831,593 | B2 | 9/2014 | Melester et al. |
| 8,843,174 | B2 | 9/2014 | Abouzid et al. |
| 9,344,174 | B2 | 5/2016 | Ngai et al. |
| 9,681,396 | B2 | 6/2017 | Williamson |
| 9,894,623 | B2 | 2/2018 | Dussmann et al. |
| 9,900,114 | B2 | 2/2018 | Fourie et al. |
| 10,291,336 | B1 | 5/2019 | Leaf |
| 10,523,346 | B2 | 12/2019 | Kummetz |
| 10,541,761 | B2 | 1/2020 | Uchimura |
| 10,594,412 | B2 | 3/2020 | Leaf et al. |
| 10,979,155 | B2 | 4/2021 | Leaf |
| RE49,217 | E | 9/2022 | Fourie |
| 11,438,080 | B2 | 9/2022 | Leaf |
| 2003/0222819 | A1* | 12/2003 | Karr .................. G01S 5/021 342/457 |
| 2005/0107080 | A1 | 5/2005 | Hasegawa |
| 2005/0206569 | A1 | 9/2005 | Arndt |
| 2006/0033640 | A1 | 2/2006 | Minor |
| 2006/0066443 | A1 | 3/2006 | Hall |
| 2006/0145884 | A1 | 7/2006 | Graham |
| 2006/0197538 | A1 | 9/2006 | Leinonen |
| 2007/0099667 | A1 | 5/2007 | Graham |
| 2008/0186233 | A1 | 8/2008 | McCoy |
| 2008/0266110 | A1* | 10/2008 | Hayford .................. H04B 5/77 340/572.8 |
| 2009/0168677 | A1 | 7/2009 | Kang et al. |
| 2010/0141483 | A1 | 6/2010 | Thacher et al. |
| 2011/0111700 | A1 | 5/2011 | Hackett |
| 2011/0307548 | A1 | 12/2011 | Fisk et al. |
| 2012/0033559 | A1 | 2/2012 | Kim |
| 2012/0289178 | A1 | 11/2012 | Matsumura et al. |
| 2012/0322501 | A1 | 12/2012 | Abouzid et al. |
| 2013/0150065 | A1 | 6/2013 | Elliott |
| 2013/0288692 | A1 | 10/2013 | Dupray |
| 2014/0024402 | A1 | 1/2014 | Singh |
| 2014/0140225 | A1 | 5/2014 | Wala |
| 2014/0203977 | A1 | 7/2014 | Gao |
| 2014/0241301 | A1 | 8/2014 | Nakashima |
| 2014/0269859 | A1 | 9/2014 | Van Hansen |
| 2015/0364031 | A1 | 12/2015 | Petite |
| 2016/0033635 | A1 | 2/2016 | Hansen |
| 2016/0095068 | A1 | 3/2016 | Henia |
| 2017/0262670 | A1 | 9/2017 | Marchant |
| 2017/0272179 | A1 | 9/2017 | Fourie |
| 2017/0310403 | A1 | 10/2017 | Nardozza |
| 2017/0373768 | A1 | 12/2017 | Antkowiak et al. |
| 2018/0027430 | A1 | 1/2018 | Pasulka et al. |
| 2018/0170127 | A1 | 6/2018 | DeBates |
| 2019/0387493 | A1 | 12/2019 | Lotter |
| 2020/0186233 | A1 | 6/2020 | Park |
| 2020/0274626 | A1 | 8/2020 | Leaf et al. |

FOREIGN PATENT DOCUMENTS

| | | |
|---|---|---|
| WO | WO 2011/091859 | 8/2011 |
| WO | WO 2013/009283 | 1/2013 |
| WO | WO 2016/009327 | 1/2016 |
| WO | WO 2016/027256 | 2/2016 |
| WO | WO 2017/197341 | 11/2017 |
| WO | WO 2020/018155 | 1/2020 |

OTHER PUBLICATIONS

U.S. Appl. No. 17/822,670, filed Aug. 26, 2022, Leaf.
U.S. Appl. No. 16/816,724, filed Mar. 12, 2020, Leaf et al.
NFPA 1221 Standard for the Installation, Maintenance, and Use of Emergency Services and Communication Systems, 2019 edition (2018).
Invitation to Pay Additional Search Fees issued in PCT/US2019/025018 on Jul. 15, 2019.
Search Report and Written Opinion issued in PCT/US2019/025018 on Sep. 9, 2019.
Comba Telecom Releases Innovative Antenna Monitoring System for Public Safety In-Building Communications Systems (Mar. 4, 2019), available at https://www.combausa.com/en/press-releases/comba-telecom-releases-innovative-antenna-monitoring-system-for-public-safety-in-building-communications-systems.
Comba CriticalPoint Antenna Monitoring System, available at https://www.combausa.com/en/products/public-safety-communications/criticalpoint-antenna-monitoring-system.
DASWizard DAS Monitoring System, available at https://consultixwireless.com/das-monitoring-system/.

* cited by examiner

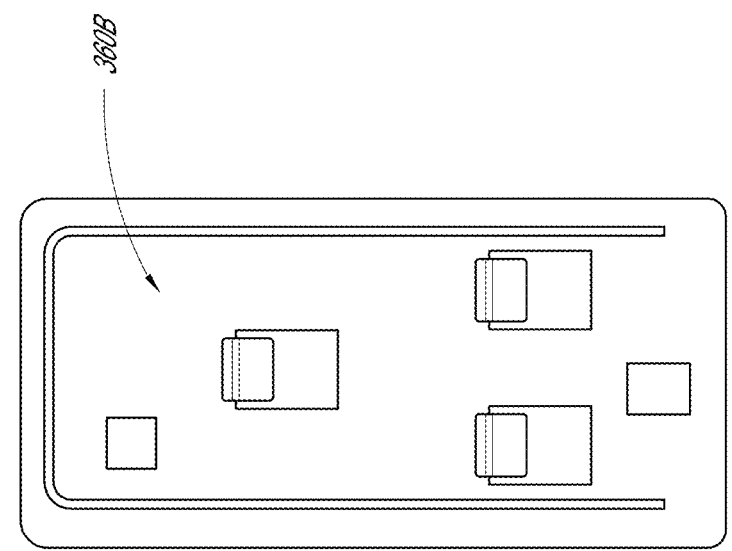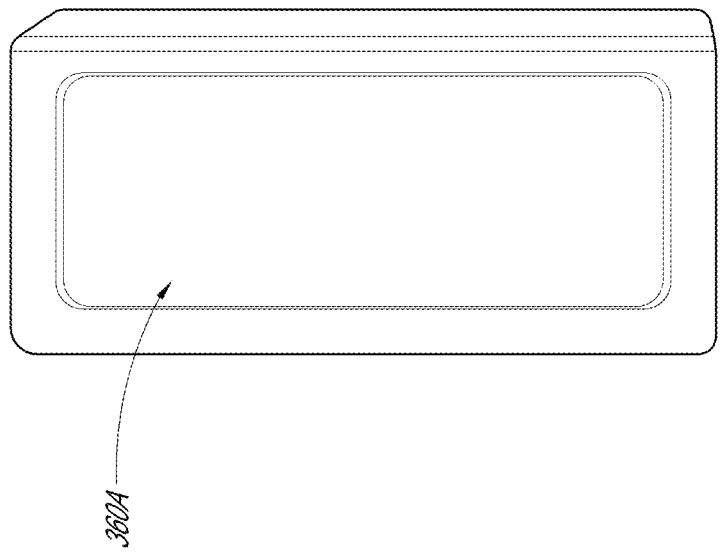
FIG. 4

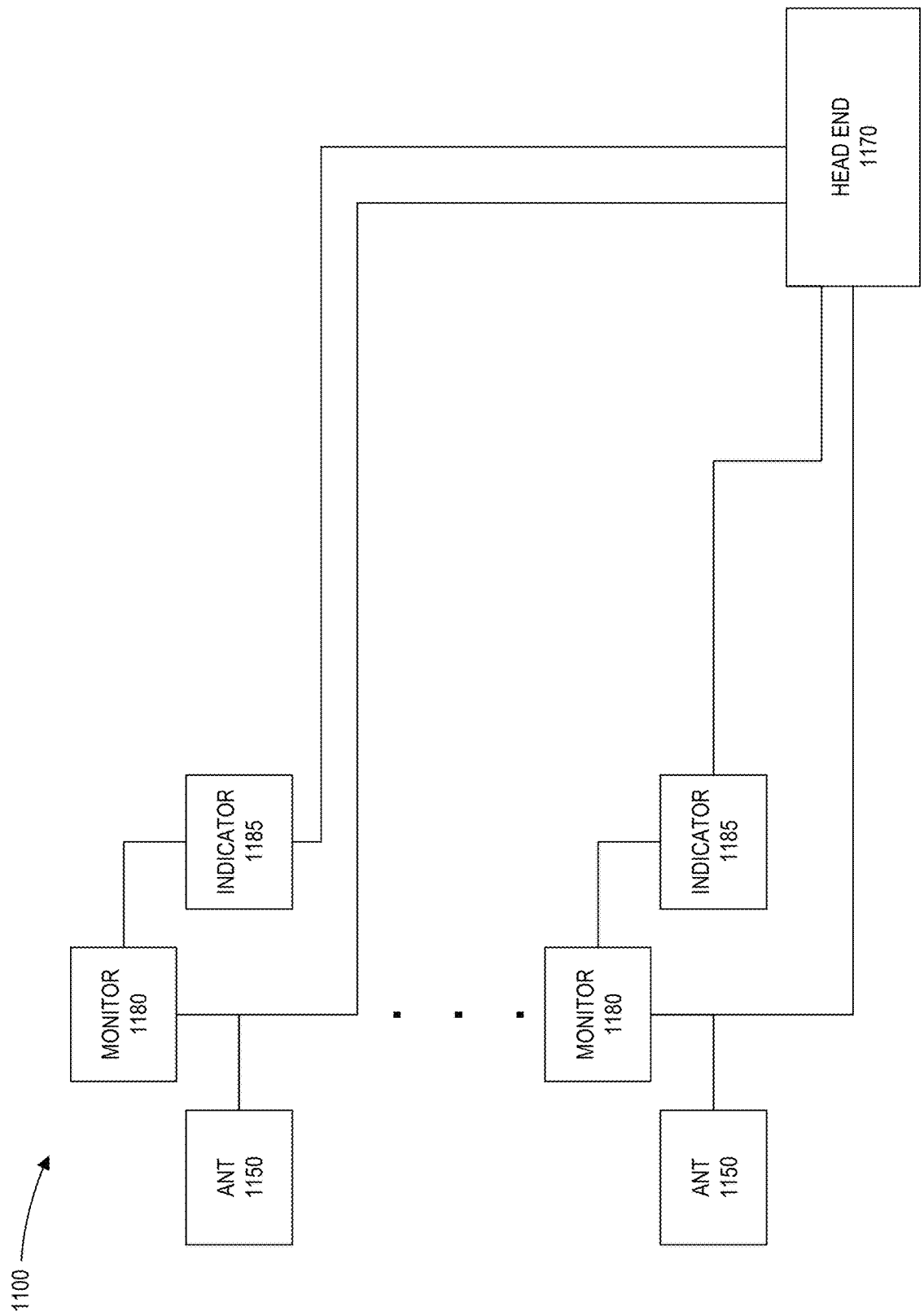

ANTENNA AND ENVIRONMENTAL CONDITIONS MONITORING FOR WIRELESS AND TELECOMMUNICATIONS FOR PRIVATE, PUBLIC, FIRST RESPONDERS, AND EMERGENCY RESPONDER RADIO COMMUNICATION SYSTEM (ERRCS)

INCORPORATION BY REFERENCE OF RELATED APPLICATION

Any and all applications, if any, for which a foreign or domestic priority claim is identified in the Application Data Sheet of the present application are hereby incorporated by reference under 37 CFR 1.57.

BACKGROUND

Firefighters often use radios within buildings to communicate with one another and with other firefighters outside. These radios typically use line-of-sight transceivers that may not adequately reach all areas of the building. In addition, tint coating on building glass in many modern buildings attenuates or blocks radio frequency (RF) signals and thereby prevents reliable communication between firefighters inside and outside the building. Similar problems may be encountered by police and other emergency personnel.

To address these problems, a distributed antenna system (DAS) can be installed in a building. A DAS can include a plurality of antennas that are distributed within a building, which can increase radio coverage for first responders like firefighters, policemen, and emergency medical technicians (EMTs). A DAS used by first responders may be referred to as a public safety DAS or Emergency Responder Radio Communication System (ERRCS). Moreover, a DAS can also be employed for other uses, including extending cellular coverage inside a building. Convention centers, for instance, may employ a DAS for large conventions to enable convention goers to maintain cellular connectivity that would be impossible without the DAS, due to the heavy load on limited cellular resources.

Referring to FIG. 1, an example prior art scenario 100 is shown in which a DAS can be implemented in a building 110. The building 110 includes a donor antenna 120 on the roof. This donor antenna 120 can communicate with external antennas, such as first responder antennas (not shown) or cellular network radio macro towers 108. The donor antenna could also be located on another portion of the building other than the roof, such as the side of the building.

The donor antenna 120 can receive signals from the first responder antennas or cellular network radio macro towers 108. These signals can be transmitted along a wire such as a coaxial cable ("coax") to a bi-directional amplifier (BDA) 130 within the building 110. The donor antenna 120 can also receive signals to be transmitted from the BDA 130 over the coax. The BDA 130 can act as a repeater that amplifies both received and transmitted signals received from or transmitted to the donor antenna 120.

The BDA 130 can supply and receive signals from additional cabling shown in the building 110. This cabling communicates with indoor antennas 160 through coax cables 150 or fiberoptic cables (not shown). The cables connect to the indoor antennas 160 and to the BDA 130 via antenna couplers 140, such as taps or splitters. The indoor antennas 160 can be provided on some or all levels of the building 110.

SUMMARY OF SOME EMBODIMENTS

An antenna monitoring system can include a plurality of monitors with electronic circuitry that can be configured to collect monitored data including at least one of a radio frequency (RF) signal data or environmental data. The system can include a plurality of transmitters associated with a plurality of antennas, a transmitter of the plurality of transmitters in communication with a monitor of the plurality of monitors, the plurality of transmitters can be configured to transmit a first plurality of signals to the plurality of antennas, a signal of the first plurality of signals including an antenna identifier for an antenna associated with a transmitter transmitting the signal and monitored data collected by a monitor in communication with the transmitter. The system can include a receiver with electronic circuitry that can be configured to: receive a second plurality of signals from the plurality of antennas, the second plurality of signals transmitted by the plurality of antennas in response to the first plurality of signals being transmitted to the plurality of antennas by the plurality of transmitters, determine from the second plurality of signals a plurality of antenna identifiers and a plurality of monitored data collected by the plurality of monitors, determine that the plurality of antenna identifiers does not include an antenna identifier for a particular antenna of the plurality of antennas, and, in response to the determination that the plurality of antenna identifiers does not include the antenna identifier for the particular antenna, output an indication corresponding to a failure of the particular antenna.

The system of the preceding paragraph and/or any of the systems disclosed herein can include any combination of the following features: the transmitters can be configured to be located in proximity to the plurality of antennas, and wherein the antenna identifier is for the antenna located in proximity to the transmitter; each monitor of the plurality of monitors can be associated with one transmitter of the plurality of transmitters; RF signal data can include one or more properties of RF signals received or transmitted by an antenna of the plurality of antennas associated with a monitor of the plurality of monitors; the signal of the first plurality of signals can include a carrier wave at a particular frequency associated with the antenna and monitored data encoded on the carrier wave, the particular frequency corresponding to the antenna identifier; each signal of the first plurality of signals can include a carrier wave at a unique frequency associated with one antenna of the plurality of antennas; electronic circuitry of the receiver can be configured to decode a second signal from the second plurality of signals to determine the monitored data.

The system of the preceding paragraph and/or any of the systems disclosed herein can include any combination of the following features: the system can further include a plurality of controllers connecting the plurality of monitors to the plurality of transmitters, the plurality of controllers can be configured to facilitate exchange of data between the plurality of monitors and the plurality of transmitters; the plurality of controllers can be further configured to provide power to the plurality of monitors; a monitor of the plurality of monitors can be supported by a transmitter in communication with the monitor; the transmitter can include a housing enclosing or supporting the monitor; the electronic circuitry of the receiver can be further configured to transmit at least some of the plurality of monitored data to a remote computing system; each transmitter of the plurality of transmitters can be configured to transmit a signal of the first plurality of signals to an associated antenna; the receiver can be configured to be connected to the plurality of antennas via a wired connection, and the electronic circuitry of the receiver can be configured to receive the second plurality of signals from the plurality of antennas via the wired connection; the wired connection can include a first wired connection between the receiver and a coupler and a second wired connection between the coupler and the plurality of antennas.

The system of the preceding paragraph and/or any of the systems disclosed herein can include any combination of the following features: at least one transmitter of the plurality of transmitters can be configured to be attached to an associated antenna of the plurality of antennas; each transmitter of the plurality of transmitters can be configured to be placed within receiving range of one antenna of the plurality of antennas but not any other antenna; the electronic circuitry of the receiver can be further configured to output the indication to at least one of a display, a fire alarm control unit, an annunciator panel, or a remote computing system; the system can be configured to monitor at least one of cellular communications network, emergency communications network, or public safety network; the system can further include the plurality of antennas.

An antenna monitoring system can include electronic circuitry that can be configured to receive a first plurality of signals from a plurality of antennas, the first plurality of signals transmitted by the plurality of antennas in response to a second plurality of signals being transmitted to the plurality of antennas by a plurality of transmitters associated with the plurality of antennas. The electronic circuitry can be configured to determine from the first plurality of signals a plurality of antenna identifiers and a plurality of monitored data collected by a plurality of monitors in communication with the plurality of transmitters. The electronic circuitry can be configured to determine that the plurality of antenna identifiers does not include an antenna identifier for a particular antenna of the plurality of antennas. The electronic circuitry can be configured to, in response to the determination that the plurality of antenna identifiers does not include the antenna identifier for the particular antenna, output an indication corresponding to a failure of the particular antenna.

The system of the preceding paragraph and/or any of the systems disclosed herein can include any combination of the following features: the plurality of monitored data can include at least one of a radio frequency (RF) signal data or environmental data; RF signal data can include one or more properties of RF signals received or transmitted by an antenna of the plurality of antennas associated with a monitor of the plurality of monitors; the transmitters can be configured to be located in proximity to the plurality of antennas, and wherein an antenna identifier is for an antenna located in proximity to a transmitter; each monitor of the plurality of monitors can be associated with a transmitter of the plurality of transmitters; a signal of the second plurality of signals can include a carrier wave at a particular frequency corresponding to an antenna identifier and monitored data encoded on the carrier wave; each of signal of the second plurality of signals can include a carrier wave at a unique frequency associated with one antenna identifier of the plurality of antenna identifiers; the electronic circuitry can be configured to decode a first signal from the first plurality of signals to determine the monitored data.

The system of the preceding paragraph and/or any of the systems disclosed herein can include any combination of the following features: the electronic circuitry can be further configured to transmit at least some of the plurality of monitored data to a remote computing system; the electronic circuitry can be configured to receive the first plurality of signals from the plurality of antennas via a wired connection; the wired connection can include a first wired connection between the electronic circuitry and a coupler and a second wired connection between the coupler and the plurality of antennas; the electronic circuitry can be further configured to output the indication to at least one of a display, a fire alarm control unit, an annunciator panel, or a remote computing system; the system can be configured to monitor at least one of cellular communications network, emergency communications network, or public safety network.

An antenna monitoring method can include collecting a plurality of monitored data including at least one of a radio frequency (RF) signal data or environmental data. The method can include transmitting a first plurality of signals to a plurality of antennas, a signal of the first plurality of signals including an antenna identifier for an antenna of the plurality of antennas and monitored data of the plurality of monitored data. The method can include receiving a second plurality of signals from the plurality of antennas, the second plurality of signals transmitted by the plurality of antennas in response to the first plurality of signals being transmitted to the plurality of antennas. The method can include determining from the second plurality of signals a plurality of antenna identifiers and a plurality of monitored data. The method can include determining that the plurality of antenna identifiers does not include an antenna identifier for a particular antenna of the plurality of antennas. The method can include, in response to determining that the plurality of antenna identifiers does not include the antenna identifier for the particular antenna, outputting an indication corresponding to a failure of the particular antenna.

The method of the preceding paragraph and/or any of the methods disclosed herein can include any combination of the following features: RF signal data can include one or more properties of RF signals received or transmitted by an antenna of the plurality of antennas; a signal of the second plurality of signals can include a carrier wave at a particular frequency for the particular antenna and monitored data encoded on the carrier wave, the particular frequency corresponding to the antenna identifier for the particular antenna; each signal of the second plurality of signals can include a carrier wave at a unique frequency associated with one antenna of the plurality of antennas; determining from the second plurality of signals the plurality of antenna identifiers and the plurality of monitored data can include decoding a second signal from the second plurality of signals to determine the monitored data; the method can further include transmitting at least some of the plurality of monitored data to a remote computing system; receiving the second plurality of signals can include receiving the second plurality of signals via a wired connection; outputting the indication can include outputting the indication to at least one of a display, a fire alarm control unit, an annunciator panel, or a remote computing system.

An antenna monitoring method can include, under control of electronic circuitry, receiving a first plurality of signals from a plurality of antennas, the first plurality of signals transmitted by the plurality of antennas in response to a second plurality of signals being transmitted to the plurality of antennas by a plurality of transmitters associated with the plurality of antennas. The method can include, under control of electronic circuitry, determining from the first plurality of signals a plurality of antenna identifiers and a plurality of monitored data collected by a plurality of monitors in communication with the plurality of transmitters. The method can include, under control of electronic circuitry, determining that the plurality of antenna identifiers does not include an antenna identifier for a particular antenna of the plurality of antennas. The method can include, under control of electronic circuitry, in response to determining that the plurality of antenna identifiers does not include the antenna identifier for the particular antenna, outputting an indication corresponding to a failure of the particular antenna.

The method of the preceding paragraph and/or any of the methods disclosed herein can include any combination of the following features: plurality of monitored data can include at least one of a radio frequency (RF) signal data or environmental data; RF signal data can include one or more properties of RF signals received or transmitted by an antenna of the plurality of antennas associated with a monitor of the plurality of monitors; the transmitters can be configured to be located in proximity to the plurality of antennas, and wherein an antenna identifier is for an antenna located in proximity to a transmitter; each monitor of the plurality of monitors can be associated with a transmitter of the plurality of transmitters; a signal of the second plurality of signals can include a carrier wave at a particular frequency corresponding to an antenna identifier and monitored data encoded on the carrier wave; each of signal of the second plurality of signals can include a carrier wave at a unique frequency associated with one antenna identifier of the plurality of antenna identifiers; determining from the first plurality of signals the plurality of antenna identifiers and the plurality of monitored data can include decoding a first signal from the first plurality of signals to determine the monitored data; the method can further include transmitting at least some of the plurality of monitored data to a remote computing system; receiving the first plurality of signals can include receiving the first plurality of signals via a wired connection; outputting the indication can include outputting the indication to at least one of a display, a fire alarm control unit, an annunciator panel, or a remote computing system.

For purposes of summarizing the disclosure, certain aspects, advantages and novel features of some embodiments are described herein. It is to be understood that not necessarily all such advantages can be achieved in accordance with any particular embodiment disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The following drawings and the associated descriptions are provided to illustrate embodiments of the present disclosure and do not limit the scope of the claims.

FIG. 4 depicts example views of the transmitter of FIG. 3.

FIG. 11 depicts another example DAS that can monitor antenna functionality.

While the foregoing "Brief Description of the Drawings" references generally various embodiments of the disclosure, such embodiments are not mutually exclusive. Rather, a myriad of combinations of some or all of such embodiments may be implemented.

DETAILED DESCRIPTION

Overview

Figure 1:
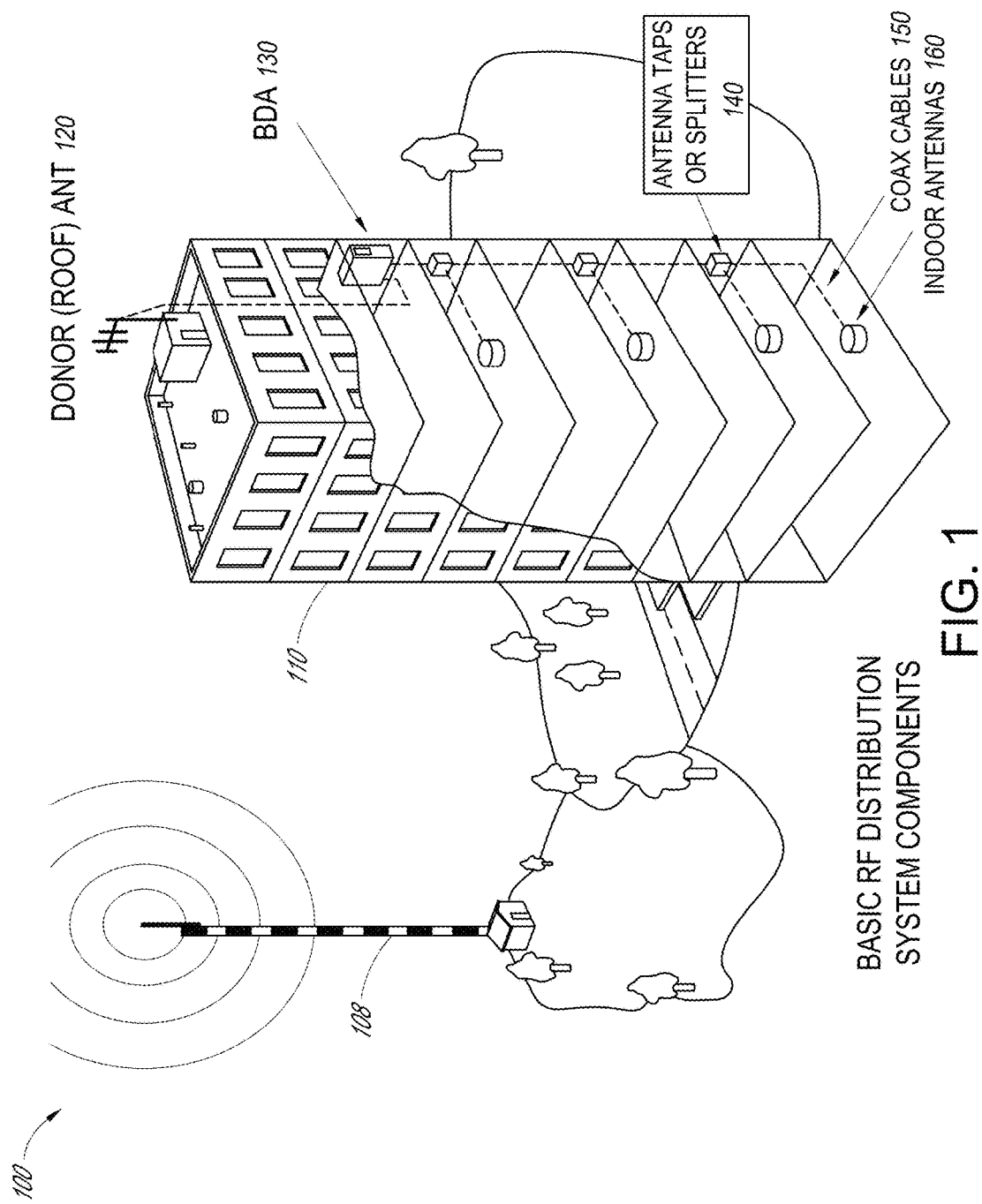
FIG. 1 depicts an example prior art scenario in which a DAS can be implemented in a building.

One problem with a DAS such as shown in FIG. 1 (described above) is that in some buildings, numerous antennas may be distributed throughout the building, such as 50, 100, or more antennas. Some antennas may fail from time to time and stop transmitting or receiving signals. Antenna failure can be due to any of a variety of reasons, including, for example, due to the failure of any component of the antenna or the cabling connecting to the antenna (including from rodent damage). If an antenna failure is undetected, then a first responder may not be able to transmit or receive using that antenna in an emergency. Thus, undetected antenna failure can lead to life-threatening situations for first responders and the people they are attempting to save. Similarly, in the cellular context, it can be desirable to provide users with as much coverage as possible to avoid user complaints and frustration from not being able to access a cellular network and associated data. Not only that, but reduced cellular coverage can limit access to emergency 911 services for cellular users. Thus, antenna failure may inconvenience multiple users.

The National Fire Protection Association (NFPA) has released a standard, NFPA 1221 (2016) and NFPA 1221 (2019), each of which is hereby incorporated by reference in its entirety, and which address the installation, maintenance, and use of emergency services communications systems. NFPA 1221 specifies that "[t]ests and inspections shall be made" of communications equipment NFPA 1221 § 11.1.1. However, testing and monitoring antennas can be difficult because it can be very time consuming to manually check the health status of dozens or hundreds of antennas in a large building. Further, DAS installation companies typically install DAS systems in numerous different venues and thus may not have sufficient employee resources to check antennas frequently. It may be that maintenance personnel may not visit a site for several months or even a few years, and thus a broken antenna may go undetected for a long period of time, cutting the signal off in the area of that antenna.

To attempt to address these problems, this disclosure describes example antenna monitoring systems and methods that can include, among other things, a transmitter for each of the antennas in a DAS. The transmitter can transmit a signal that includes antenna identification (or antenna identifier) via antenna it is in proximity to for detection by a receiver. For example, the transmitter can transmit data on a certain frequency or channel corresponding to the antenna it is close to, so that the various transmitters in the DAS each transmit on the same or on different frequencies. These frequencies can be detected by the receiver and can be processed to determine whether a signal at any frequency or channel expected to be received is missing. As another example, the transmitter can transmit a signal with an antenna identifier corresponding to the antenna located in proximity to the transmitter. For instance, antenna identifier can be a unique id (such as, unique id of an RFID tag). Each transmitter can transmit a signal with a different antenna identifier. Transmitted signals can be detected by the receiver and processed to determine whether an antenna identifier for the particular antenna is missing.

If any expected antenna identifier is missing (for example, if signal is missing for any frequency or channel), the receiver can infer that the antenna or a component associated with the antenna (such as cabling or a transmitter associated with the antenna) may have failed. The receiver can then output an indication or notification that may be accessed by maintenance personnel and/or emergency personnel to enable them to quickly identify and repair the non-functioning antenna or component. Instead of or in addition to looking for missing signals, the receiver can also detect antennas that are supplying very low signals (for example, below a threshold), which may also constitute a failure of the antenna or component.

Example DAS that Monitors Antenna Functionality

Figure 2:
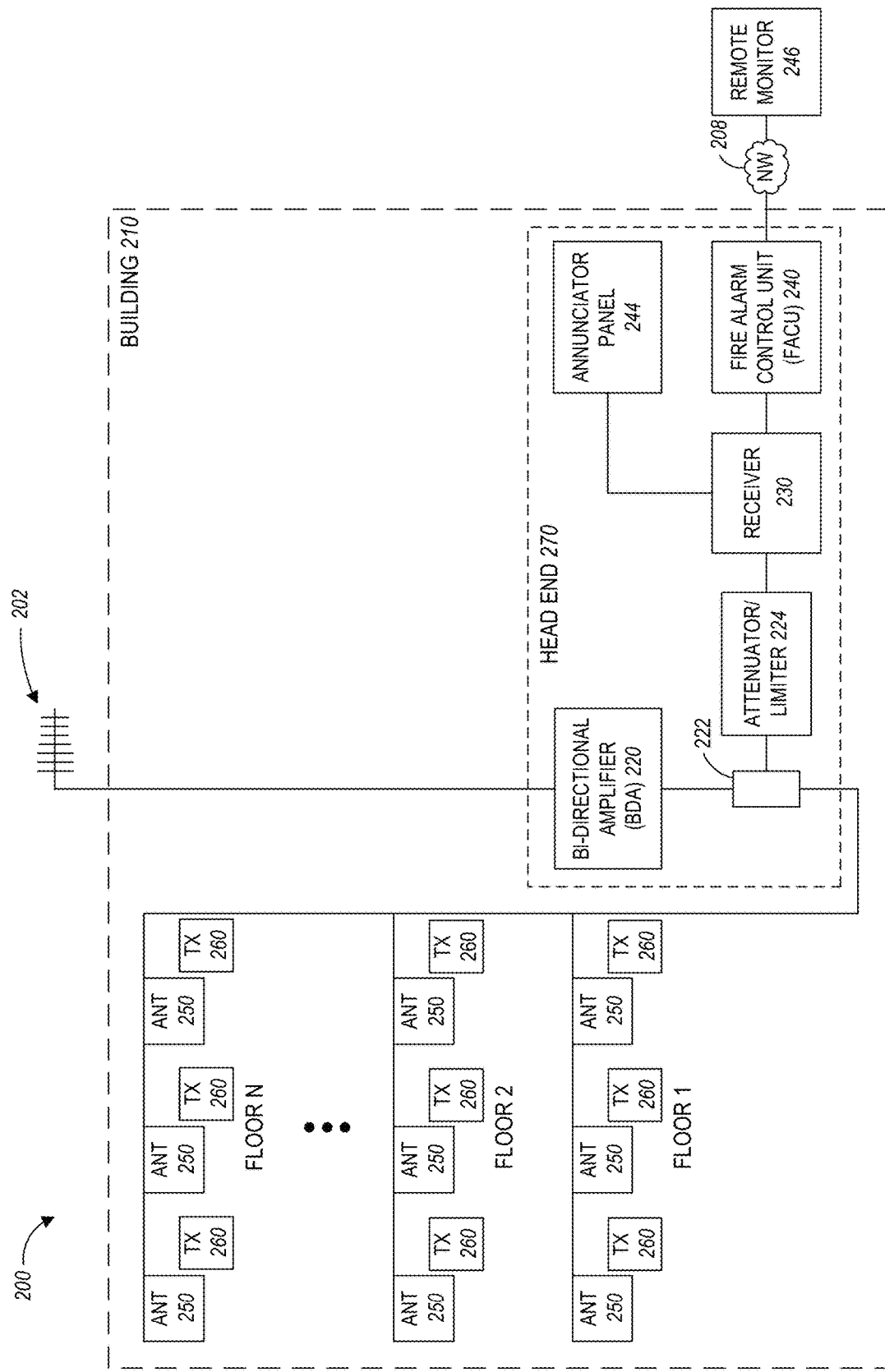
FIG. 2 depicts an example DAS that can monitor antenna functionality.

Turning to FIG. 2, an example DAS 200 is shown that can implement some or all of the features just described. The DAS 200 is shown implemented in a building 210. The DAS 200 can be implemented in any building or venue, including office buildings, hospitals, stadiums, and even outdoors (such as in outdoor malls), and the like, without limitation. The DAS 200 can include antenna monitoring functionality that can detect when an antenna or related component is no longer functioning properly, thereby enabling troubleshooting of the faulty antenna or component and thereby bringing reliable service back online quickly.

In this example, the DAS 200 includes a donor antenna 202 in communication with a bi-directional amplifier (BDA) 220. The BDA 220 is shown in communication with a coupler 222, which may be a tap, splitter, or the like. The coupler 222 is in communication with the plurality of antennas 250 and a head end 270. Each of the antennas 250 can be indoor antennas like the ones described above with respect to FIG. 1. The antennas 250 can also be outdoor antennas (for example, in an outdoor mall). Three antennas 250 are shown on each of three floors; floor 1, floor 2, and floor N. An ellipsis between floor 2 and floor N indicate that any number of floors may be used in the DAS 200. Further, any number of antennas 250, from one to several, may be installed on any given floor in a building 210. The antennas 250 need not be installed on every floor. While the antennas 250 are described as being located on floors, any of the antennas 250 can be installed in any location, which may or may not be a floor of a structure.

In proximity with each antenna 250 is a transmitter 260. Each of the transmitters 260 can include hardware and optionally software that transmits antenna identification, which can be a signal (such as a carrier wave or any other suitable signal) at a specific frequency. In some cases, the transmitters 260 may operate at a different frequency or channel for each antenna 250. As a result, each antenna 250 can detect and then transmit a signal at a different frequency, making that antenna's output (and thus functioning) readily identifiable by frequency, which can satisfy the NFPA code and meet emergency 911 needs.

Each antenna 250 may be in proximity with its corresponding transmitter 260. An antenna 250 and a transmitter 260 "in proximity," in addition to having its ordinary meaning, can mean, among other things, that the antenna 250 and transmitter 260 can be in contact with or otherwise mechanically attached to each other, or that the antenna 250 and transmitter 260 can be a short distance away from one another (such as within a number of centimeters, within about one meter, or within about two meters), or that the transmitter 260 may be within a receive range of the antenna 250 such that the transmitter 260 can transmit a signal that will be received by the antenna 250 but that will not be received by another antenna 250 within the same building (or that the received signal will be below a threshold at other antennas 250 within the building). Thus, for example, while another antenna 250 in the building may receive a signal from another antenna's 250 transmitter 260, that signal may be at a very low level and possibly below a noise floor. A transmitter 260 can be attached to a wall or junction box near its corresponding antenna 260 in some installations. The transmitter 260 may be within about 1 to 2 meters of the antenna 250 in some installations. The transmitter 260 may also be directly behind the antenna 250. Moreover, the transmitter 260 may be internal to the antenna 250, such that the antenna 250 may be sold with the transmitter 260 integrated therewith.

As described above, the coupler 222 can couple cables, such as coaxial or fiberoptic cables, between the different antennas and the BDA 220. The coupler 220 can also couple the BDA 220 and the antennas 250 to the head end 270. The head end 270 can include a plurality of components that may be in an electrical room of the building 210 or in some other location of the building 210 (such as in a basement or electrical closet). The BDA 220 may be part of the head end 270. The head end 270 can include an attenuator and/or limiter 224, a receiver 230, a fire alarm control unit (FACU) 240, and an annunciator panel 244. Fewer than all of the components shown may be provided in other implementations.

The attenuator/limiter 224 can attenuate and/or limit incoming signal from the coupler 222 to avoid sending too strong of a signal to the receiver 230, which might damage the receiver 230. The receiver 230 can include a processor, memory, and a display. The receiver 230 can receive signals from the antennas 250 through the coupler 220 and the attenuator/limiter 224. The receiver 230 can analyze the signals using the processor to determine whether any antenna identification is missing. For example, the receiver 230 can determine whether any of the antennas 250 are not receiving on a specific frequency transmitted by a transmitter 260. If the receiver 230 identifies that a signal at a specific frequency is not received, then the receiver 230 can output an indication of a component failure. The component failure can indicate that an antenna 250 corresponding to that frequency has failed or that some other component associated with that antenna 250 has failed (such as a coupler or cable).

The receiver 230 can output this component failure indication on a display of the receiver 230. Further, the receiver 230 can also output the component failure indication to one or more other devices, including the FACU 240 and the annunciator panel 244. The FACU 240 can control fire alarms in the building and can also include a display that outputs the indication received from the receiver 230. The FACU 240 can also communicate the component failure indication over a network 208 (which may include the Internet, a local area network, a wide area network, or the like) to a remote monitor 246. The remote monitor 246 may be a device (such as a computer or annunciator panel) installed in a fire station or other emergency communications facility. A remote monitor 246 may instead or also be located at a provider facility corresponding to a provider of the DAS 200.

The annunciator panel 244 can also receive an indication of a component failure from the receiver 230 and can output the indication of the failure. This indication may be a lamp, LED, or the like that lights up to indicate that a component has failed (but may or may not indicate which component failed). The annunciator panel 244 may provide firefighters or other emergency personnel a quick, at-a-glance view that a component has failed. The annunciator panel 244 can act as a redundant component to the FACU 240 and may be more reliable than the FACU 240 in the event of a fire or other emergency.

The DAS 200 can be an active DAS or a passive DAS. An active DAS can include fiberoptic cable instead of coax or in conjunction with coax. A passive DAS typically includes coax cable instead of fiberoptic cable. Fiberoptic cable can enable antennas 250 to be dispersed over a wider range, such as in a larger building, due to less line loss than coaxial cable. As an alternative to fiberoptic cables for large venues, multiple BDAs and receivers may be spread throughout a building, connected by coax, so that each BDA and receiver correspond to a subset of the antennas in the building. The multiple receivers can send their indications to a single head end that includes an FACU and an annunciator panel or the like. Many other configurations are also possible.

The receiver 230 can also detect larger-scale failures and report these failures. For instance, if the receiver 230 does not receive expected signals from all antennas 250 on one floor, the receiver 230 can indicate that there may be a problem with a coupler that feeds line to that floor. If the receiver 230 does not receive any expected signals, the receiver 230 may indicate that the coupler 222 or some other major component may have failed.

Although the system shown in FIG. 2 is a DAS, it should be understood that the inventive features described herein are not limited to being implemented in a DAS. Rather, some or all of the features described herein can be implemented in cellular sites, such as radio macro antennas, or in other antenna installations.

Figure 3:
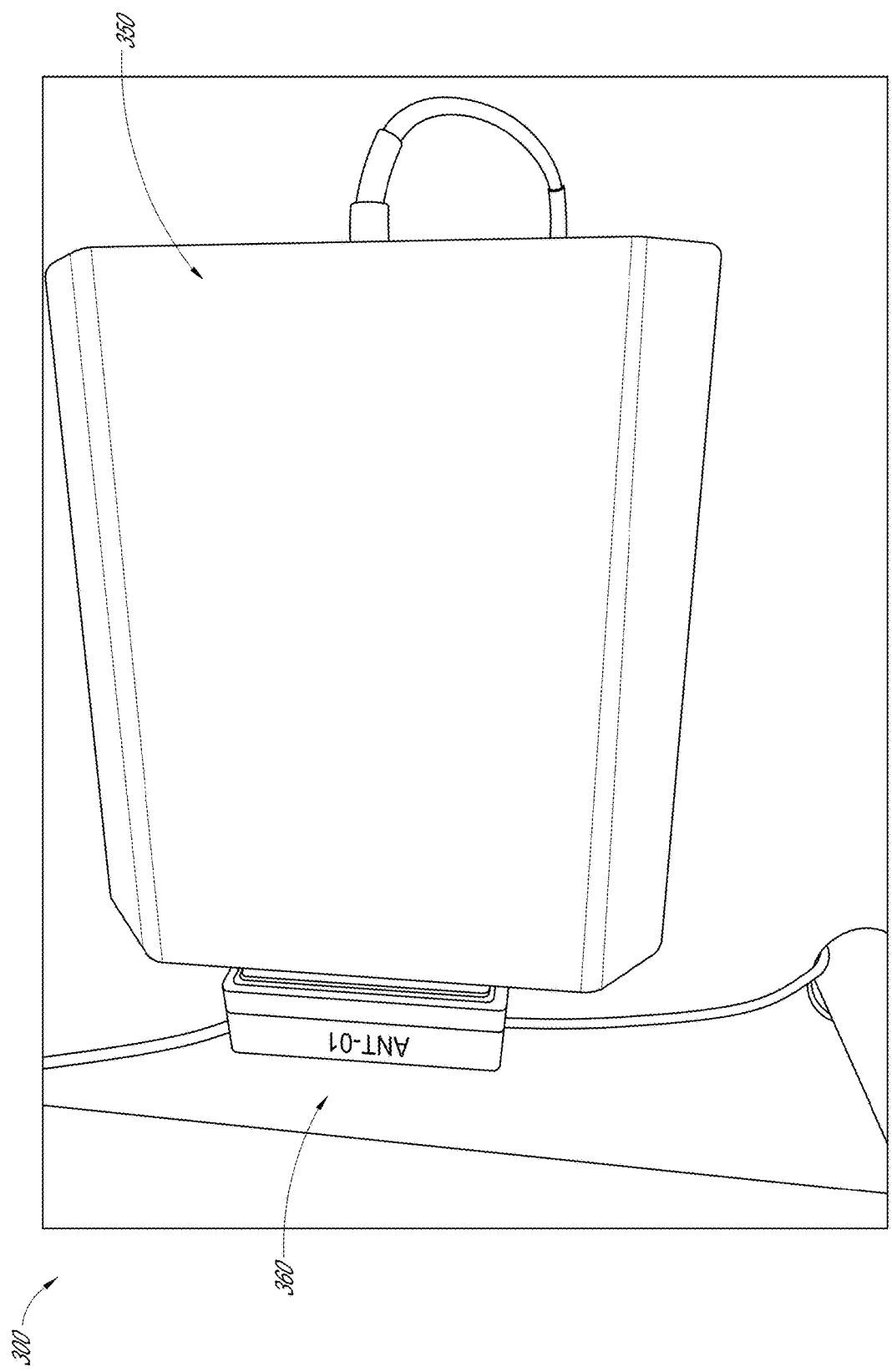
FIG. 3 depicts an example antenna and transmitter installation.

Turning to FIG. 3, an example antenna and transmitter installation 300 is shown. The antenna installation 300 includes an antenna 350, which is an example of the antenna 250 described above with respect to FIG. 2. The antenna installation 300 also includes a transmitter 360, which is an example of the transmitter 260 described above with respect to FIG. 2. The transmitter 360 is shown connected or attached mechanically to the antenna 350 in this example installation 300. In other configurations, as described above, the transmitter 360 need not be connected directly to the antenna 350.

In some implementations, the transmitter 360 transmits at a power that is sufficient to be detected above the noise floor at the antenna 350 but not so high as to create stray currents in the coax connected to the antenna 350. For example, the transmitter 360 can transmit at about −15 dBm (decibels relative to one milliwatt). However, in other implementations, the transmitter 360 can transmit in the range of about −20 dBm to about 0 dBm, or in the range of about −25 dBm to about 5 dBm, or in the range of about −30 dBm to about 20 dBm, or in some other range.

The transmitter 360 may be battery powered. It can be useful to reduce battery consumption of the transmitter 360 because having a transmitter fail 360 can be nearly as significant a problem as an antenna failing 350 (if a transmitter 360 fails, the receiver 230 may indicate that the antenna 350 has failed). To conserve battery, the transmitter 360 can be configured to transmit at a rate that reduces power consumption. For instance, the transmitter 360 can transmit periodically, such as once every few minutes, once every hour, once every day, once every 48 hours, or at some other interval. Current transmitters may have a battery life of about two years. In present and future antenna implementations, including 5G wireless, which may use millimeter wave frequencies, the transmitter 360 can be a millimeter wave transmitter that consumes so little power as to be able to have a battery life of ten years or more. In general, any of the features described herein can be used in any cellular installation, such as a 5G wireless installation or in installations supporting subsequent wireless standards.

The transmitter 360 can include or be connected to a photovoltaic power source (such as, a solar panel). For example, the transmitter 360 can include or be connected to one or more solar panels configured to store energy in one or more energy storage elements, such as one or more capacitors. Photovoltaic power may be utilized for cellular sites as cellular antennas are typically placed outdoors.

The transmitter 360 can transmit on any of a variety of frequencies. For instance, the transmitter 360 can transmit on the 900 MHz band (for example, between about 902 MHz and about 928 MHz, or some other range), and the antenna 350 may communicate with public safety radios or cellular radios on the 800 MHz band. However, other frequency bands may be used without limitation, such as any band in the range of 0 Hz to 20 GHz or higher. For example, the transmitter 360 may transmit on frequencies other than the 900 MHZ band to avoid interfering with hospital paging systems (if the transmitter 360 is installed in a hospital or other medical facility). More generally, the transmitter 360 can transmit at frequencies in the range of about 0 Hz to 20 GHz or higher. The transmitter 360 may operate on licensed or unlicensed frequencies.

As disclosed herein, any of the transmitters can include hardware, such as electronic circuitry (which can include one or more processors). Transmitter hardware can include a chipset configured to transmit any of the signals disclosed herein. Any of the antennas disclosed herein can include a chipset configured to receive any of the signals from the transmitter. The transmitter chipset can be configured to implement monitoring functionality as described herein. For example, monitoring functionality can be used to detect and transmit receiving or transmission power of the antenna located in proximity of the transmitter, environmental data, or the like. Such detection and transmission can be performed in real time or substantially in real time. In some cases, monitoring could be used for focused beam technology for 5G by carriers to improve and monitor service, which can facilitate ensuring optimal functionality, low (or zero) latency, or the like.

Turning to FIG. 4, two example views of the transmitter 360 are shown, including a front view 360a and a rear view 360b. This transmitter 360 is an example transmitter model number VL965-B7 available from Systems Technologies, Inc. The transmitter 360 can be an off-the-shelf transmitter used typically in nurse call functions in hospitals. These types of transmitters may be good transmitters for this application because they can be battery-operated and can operate in a frequency band that is different from the main operating frequency band of the antenna 250 or 350, so as to reduce interference between the two frequency bands.

Figure 5:
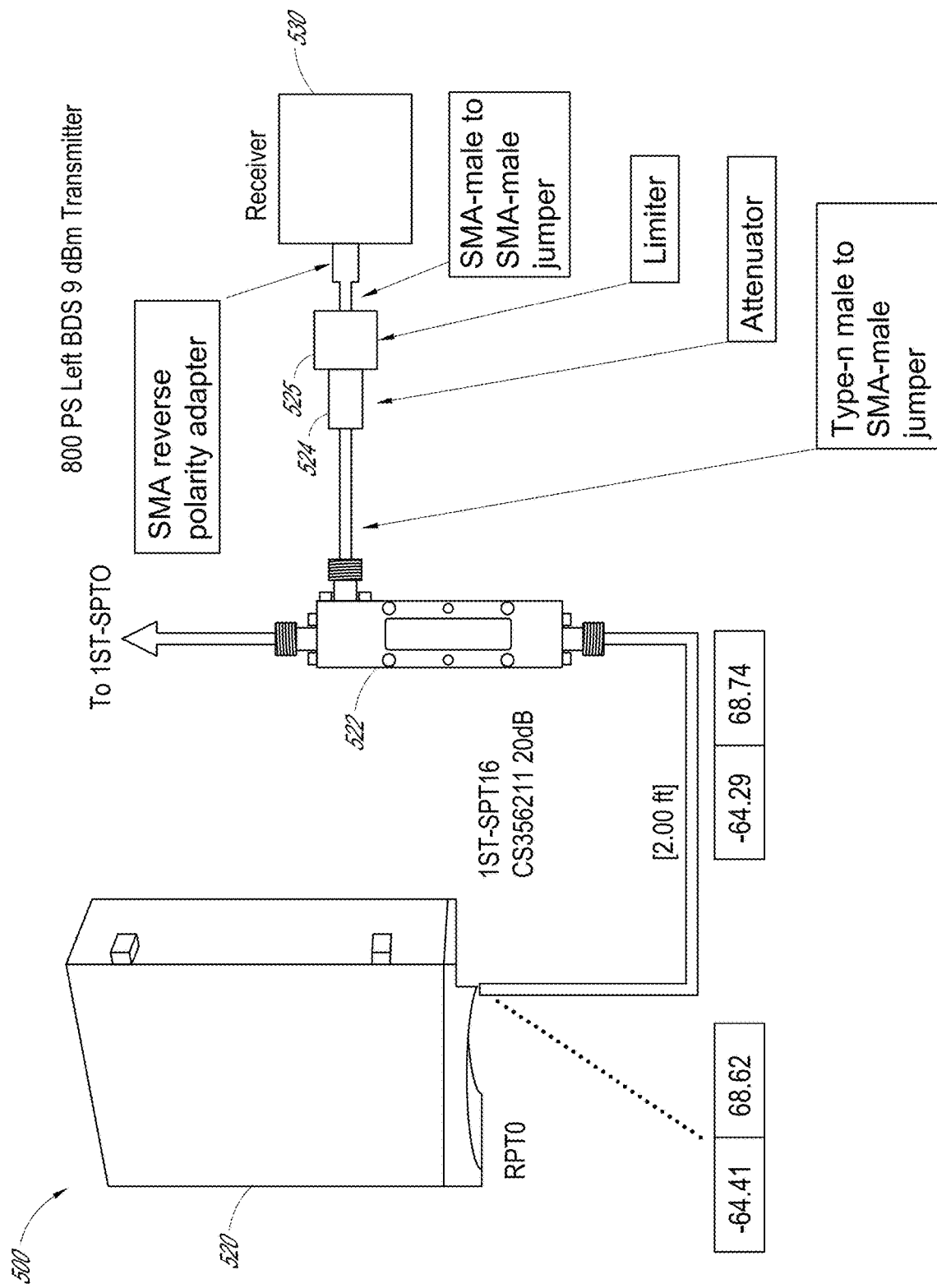
FIG. 5 depicts an example head end of a DAS.

Turning to FIG. 5, an example head end 500 is shown with a BDA 520 that is connected via coax cable to a coupler 522, attenuator 524, limiter 525, and receiver 530. The coupler 522 is connected to a receiver 530 via cabling, an attenuator 524, and a limiter 525. The BDA 520 is an example of the BDA 220 of FIG. 2. Likewise, the coupler 522, the attenuator 524, limiter 525, and receiver 530 are examples of their respective counterparts from FIG. 2.

Example component types are listed in FIG. 5, which may be varied in various embodiments. The coupler 522, for instance, can be a tap that provides unequal signal distribution at the different outputs of the tap to enable an antenna that is farther from the receiver to receive an appropriate amount of signal. Due to signal loss over longer distances, the output of the tap to a more distant antenna may be greater than to a closer antenna. The cable from the upper connection of the coupler 522 can be connected to the antennas 250 through other couplers (see, e.g., FIGS. 10A and 10B). For simplicity, a connection to a donor antenna from the BDA 520 is not shown.

The attenuator 524 can reduce the signal received from the coupler 522 to avoid sending a signal of too high a level to the receiver 530. The limiter 525 can limit the level of the signal to a certain dBm value to attempt to prevent transient spikes from damaging the receiver 530. Example cable lengths are shown as well as example dBm values for inputs and outputs of the different components. These values may be varied in other embodiments.

Figure 6:
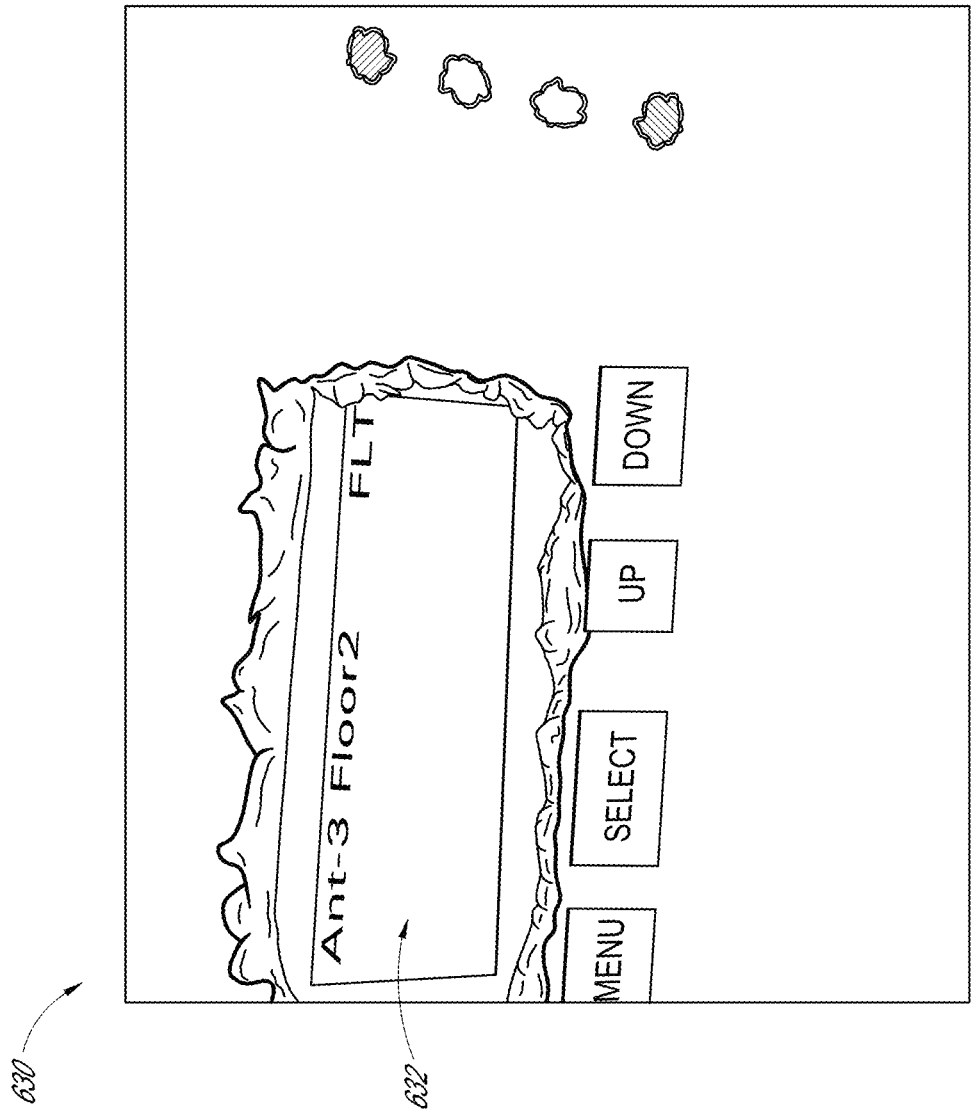
FIG. 6 depicts an example of a front portion of a receiver.

Turning to FIG. 6, an example of a front portion of a receiver 630 is shown. The receiver 630 shown is a model VL400-B7 available from Systems Technologies, Inc. Other types of receivers may be used.

The front portion of the receiver 630 is zoomed in to show a close-up of a display 632 of the receiver. The display 632 includes the text "Ant-3 Floor 2 FLT," which can indicate that antenna number 3 on the second floor has a fault. A map of the building may be provided near the receiver 630 for first responders to find where antenna 3, as well as other antennas, are located.

Figure 7:
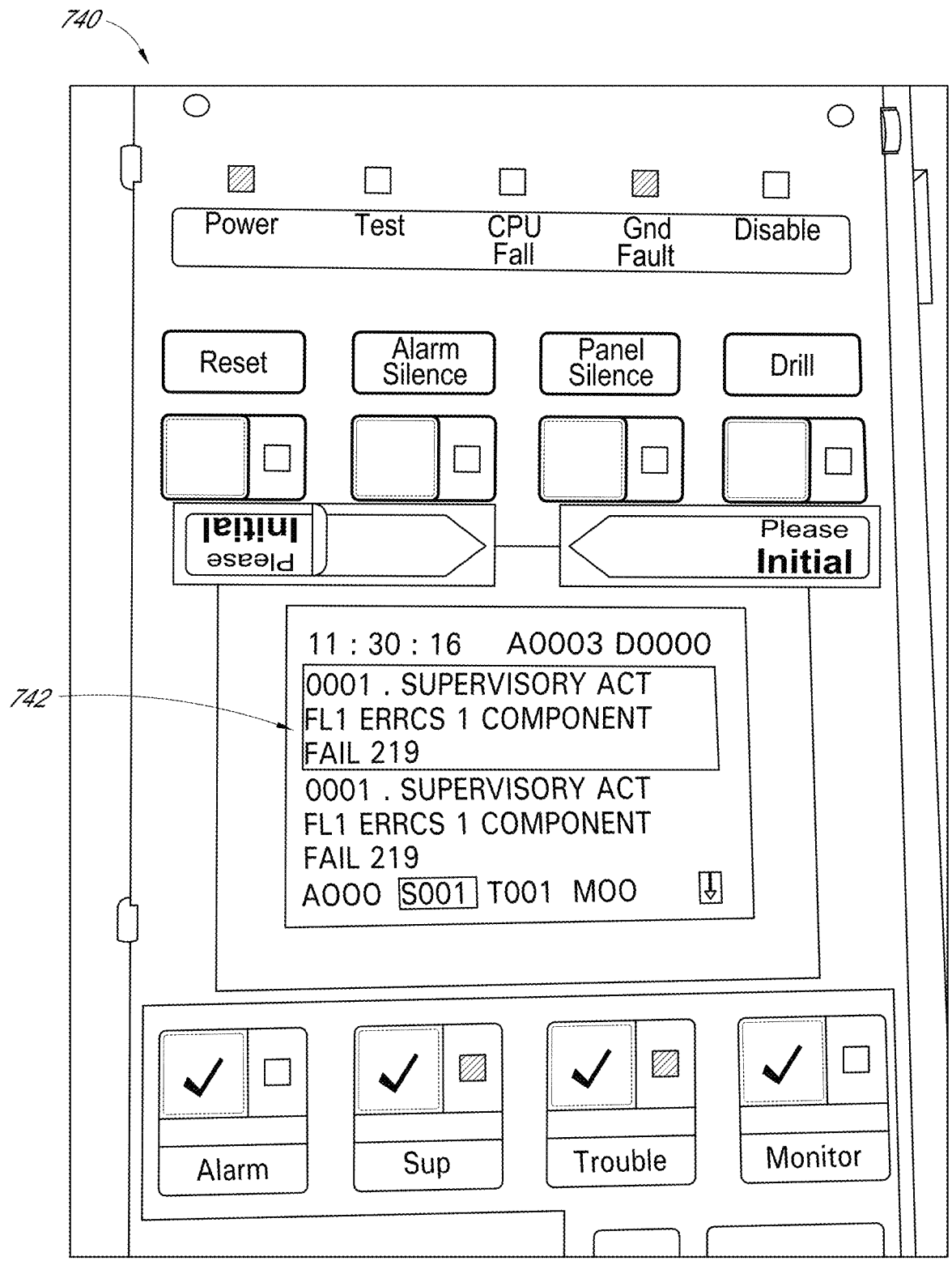
FIG. 7 depicts an example panel of a fire alarm control unit.

Turning to FIG. 7, an example panel of an FACU 740 is shown. The FACU 740 includes a display 742 which also includes information that can be received from the receiver described above, and which includes text that indicates that an ERRCS 1 component failed 219. The ERRCS component refers to an emergency responder radio communications system component, such as an antenna, and the number 219 can refer to a region of the building. The information on the display of the FACU 740 can be transmitted to the remote monitor 246 at the fire department or other emergency communications center, as described above.

Figure 8:
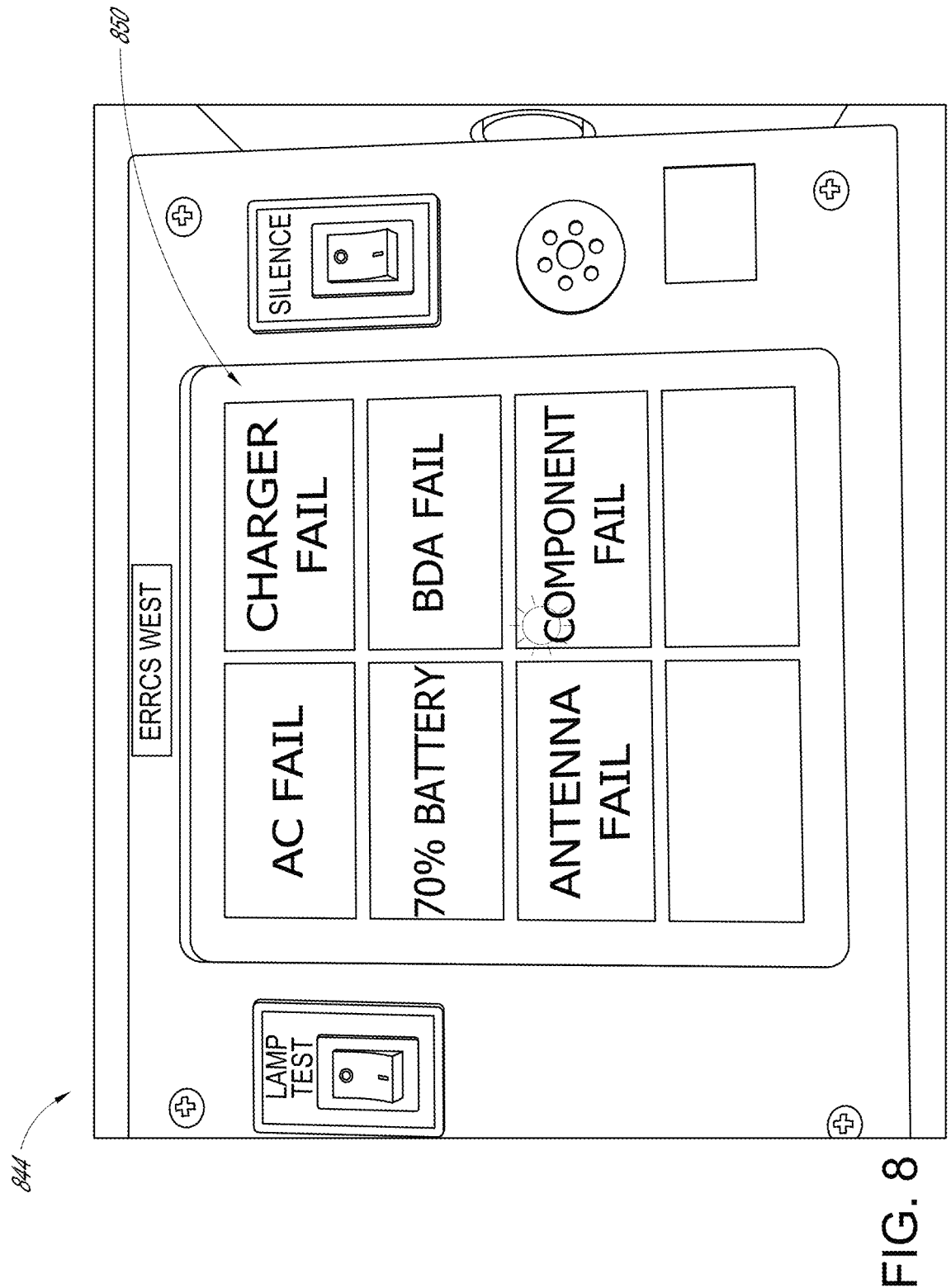
FIG. 8 depicts an example annunciator panel.

Turning to FIG. 8, an example annunciator panel 844 is shown corresponding to the annunciator panel 244 of FIG. 2. The annunciator panel 844 includes lamp areas 850 that are labeled. If a lamp is lit, the condition specified by text 850 corresponding to the lamp has occurred. Thus, in the depicted example, a lamp has indicated that there is a component failure.

Figure 9:
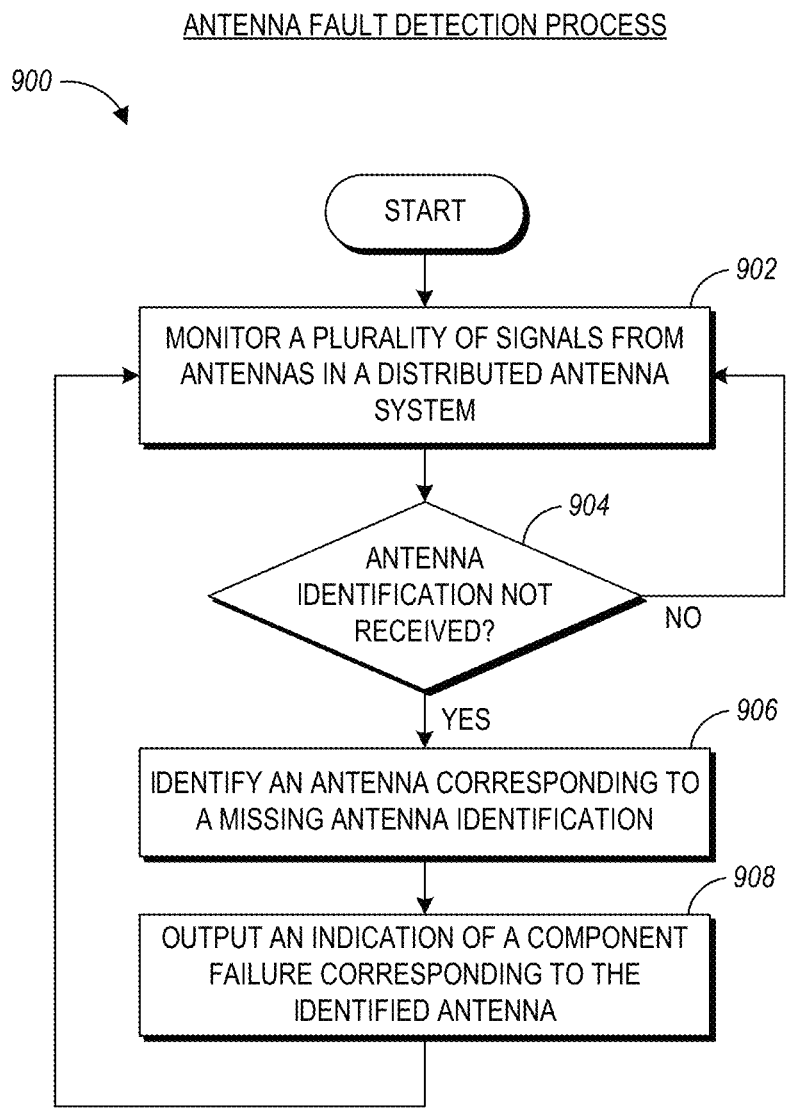
FIG. 9 depicts an example antenna fault detection process.

Turning to FIG. 9, an example antenna fault detection process 900 is shown. The antenna fault detection process 900 can be implemented by any of the receivers described herein. For example, a hardware processor of a receiver may implement the process 900 shown to detect a fault with an antenna or another component corresponding to that antenna.

At block 902, the receiver monitors a plurality of signals from antennas in a distributed antenna system. At decision block 904, if any expected antenna identification is not received (for example, is signals are not received from any expected frequencies), then the receiver at block 906 identifies an antenna corresponding to the missing antenna identification (for example, missing signal frequency) and outputs an indication of a component failure corresponding to the identified antenna at block 908. Otherwise, from decision block 904, if all expected antenna identification have been received (for example, signals are received from all expected frequencies), then the process 900 loops back to block 902 where the receiver continues to monitor a plurality of signals from the antennas in the DAS.

In another embodiment, instead of determining whether no signals are received, the process 900 can determine whether an expected signal is below a threshold in signal level. An abnormally low signal level can indicate a problem with an antenna or related component, even if the signal is in fact received. If the signal level corresponding to a particular frequency is too low, the receiver can output an indication of a fault with the antenna or a component corresponding with that antenna.

Figure 10A:
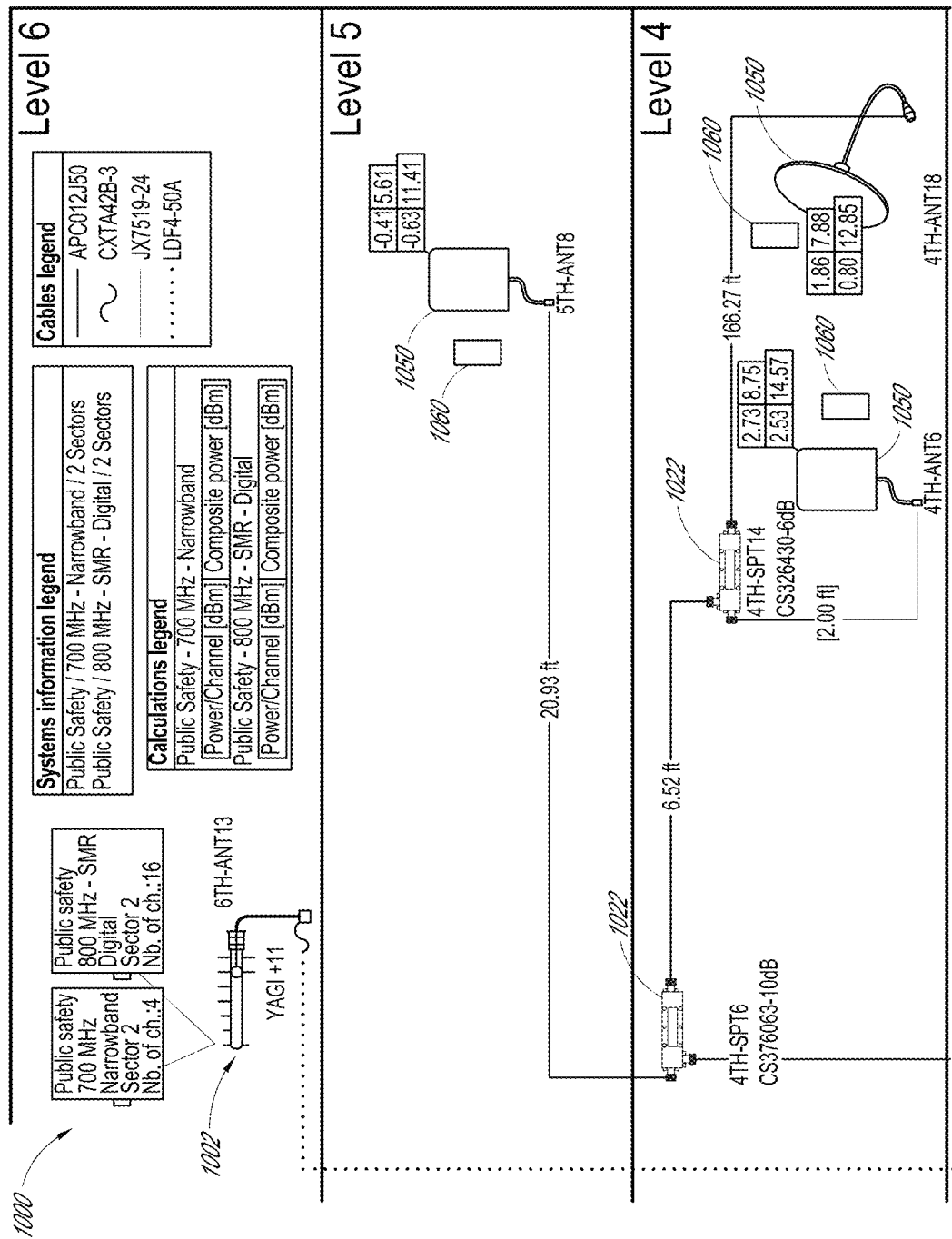
FIGS. 10A and 10B depict a portion of an example DAS installation in an actual building.
Figure 10B:
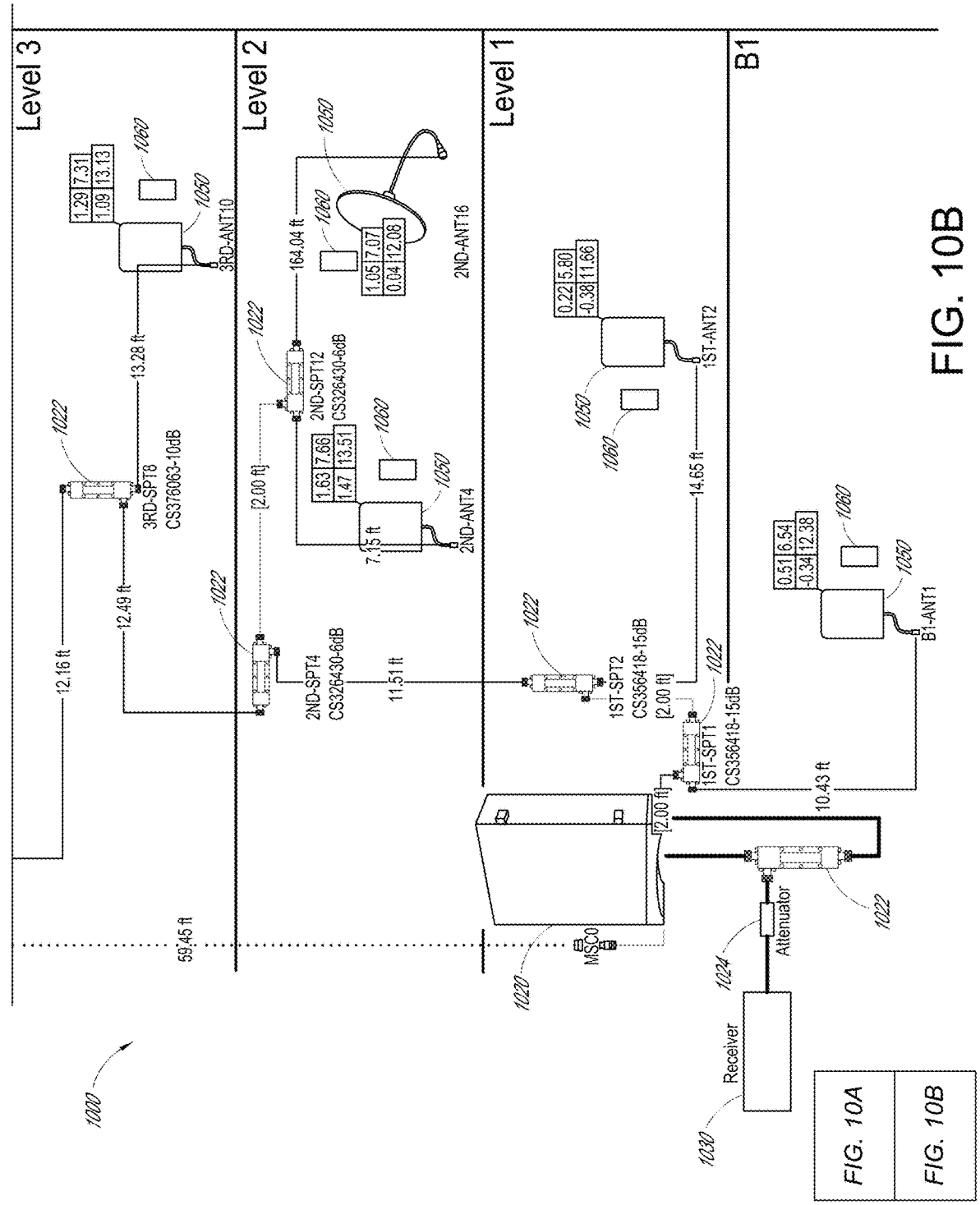

Turning to FIGS. 10A and 10B, an example DAS 1000 is shown as a portion of a DAS in a building. The DAS 1000 includes several components similar to those described above, including a donor antenna 1002, couplers 1022, antennas 1050, transmitters 1060, a BDA 1020, an attenuator 1024, and a receiver 1030.

The DAS 1000 shown can represent a full DAS in a building or one subset of a DAS in an actual building. For instance, the DAS 1000 can be part of a larger DAS separated into two or more separate DAS's that cover different areas of the building. One area serviced by one subset of the DAS (or sub-DAS) can include, for example, the stairwells, while another area serviced by another sub-DAS can include the remaining portions of the floors. Covering the stairwells with a separate sub-DAS can provide backup functionality for first responders in the stairwell, which can be an important point of access for first responders to a building. When multiple sub-DASs are used as part of a DAS, each sub-DAS can have each of the components shown or some subset or superset thereof, including a separate donor antenna.

FIG. 11 illustrates an example DAS 1100. Similarly to the DAS 200 of FIG. 2, a plurality of antennas 1150 and a head end 1170 are shown. Any of the antennas 1150 can have one or more features of any of the antennas 250 and/or any other antennas described herein. The head end 1170 can have one or more features of the head end 270 and/or any other head end described herein. The antennas 1150 can be coupled by one or more cables or wires to a BDA of the head end 1170, as described herein.

Figure 12:
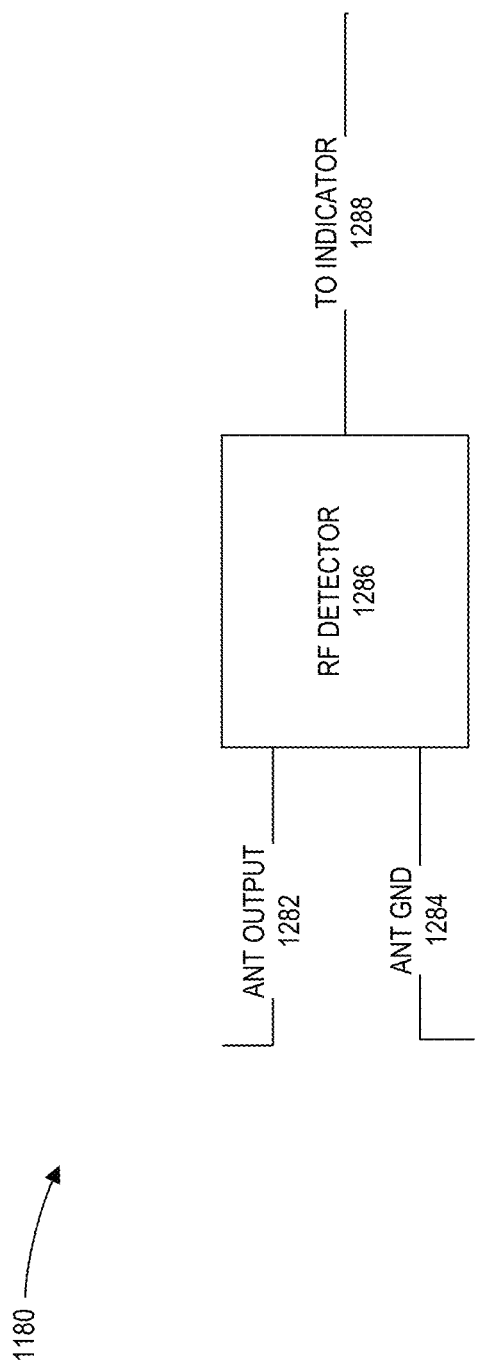
FIG. 12 depicts an example antenna monitor.

An antenna monitor 1180 can monitor one or more signals emitted by a corresponding antenna 1150. The antenna monitor 1180 can include electronic circuitry configured to perform such monitoring. The antenna monitor 1180 can be placed in proximity to the corresponding antenna 1150, as described herein. As shown in FIG. 12, the antenna monitor 1180 can include a signal detector 1286 configured to detect RF signals emitted by the corresponding antenna 1150. The signal detector 1286 can be connected to the corresponding antenna 1150 via a wired connection. For example, the signal detector 1286 can be connected to an output terminal 1282 and a ground terminal 1284 of the corresponding antenna 1150. In some implementations, the signal detector can wirelessly detect RF signals emitted by the corresponding antenna 1150 without the wired connection. The signal detector 1286 can perform such detection over a time period. The signal detector 1286 can output a signal 1288 of whether any RF signals emitted by the corresponding antenna 1150 have been detected.

An indicator 1185 can receive a signal from a corresponding antenna monitor 1180. For example, as illustrated in FIG. 12, the signal 1288 can be output from the signal detector 1286 to the indicator 1185. The indicator 1185 can provide an indication of whether any RF signals emitted by the corresponding antenna 1150 have been detected. The indicator can include electronic circuitry configured to provide such indication. If the corresponding antenna 1150 has not emitted any RF signals, the indicator 1185 can provide an indication of a component failure of the corresponding antenna 1150. The indication can, for example, include turning on a visual indicator, such as an LED light. The indicator 1185 can output the component failure indication to one or more other devices, such as a FACU and an annunciator panel of the head end 1170, as described herein. As illustrated in FIG. 12, the indicators 1185 associated with the antennas 1150 can be connected to such one or more devices by one or more cables or wires. The component failure indication can include any of the indications described herein, such as visual, audible, communication to a remote computing device, or the like.

The indicator 1185 can be positioned proximate to the corresponding monitor 1180. The indicator 1185 and the corresponding monitor 1150 can be enclosed in the same housing or in different housings.

Additional Monitoring Functionality

Any of the transmitters can additionally or alternatively monitor one or more additional parameters or conditions (sometimes referred to as monitored data). Such conditions can include one or more of RF signal strength (for example, associated with RF signals received or transmitted by the antenna), environmental parameters or data, or the like. Data relating to the one or more additional conditions can be transmitted to a receiver (or multiple receivers) as disclosed herein.

Figure 13:
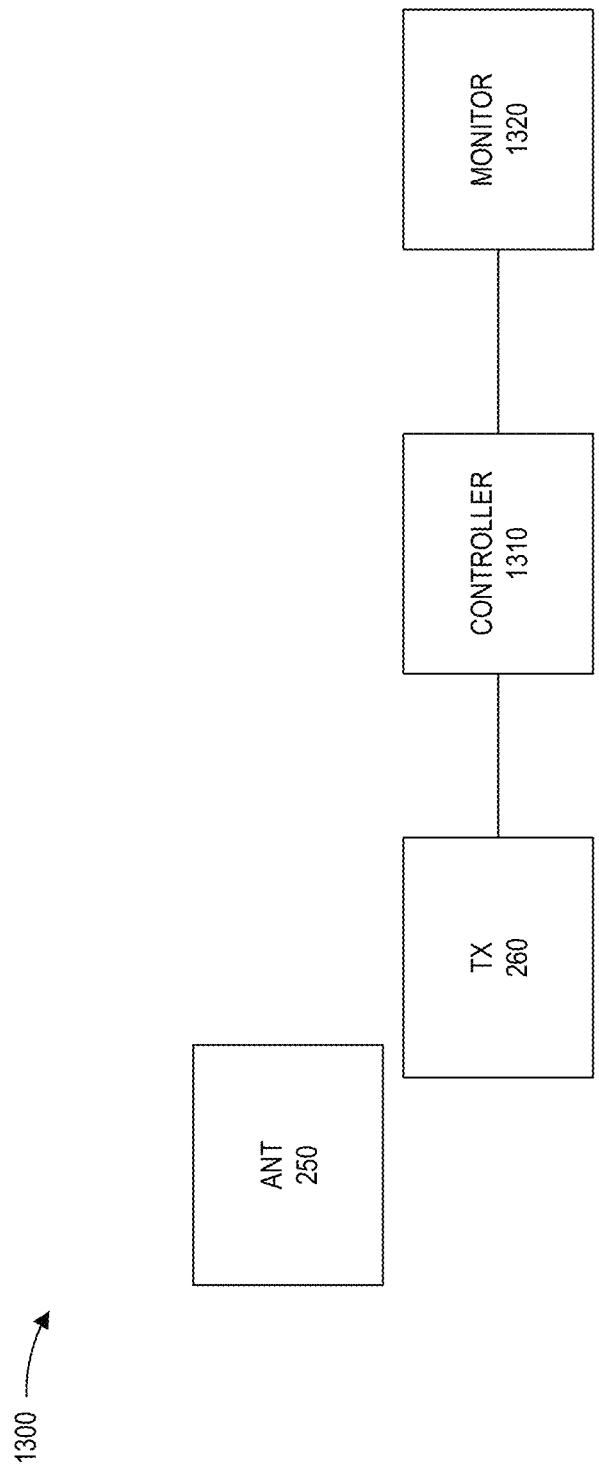
FIG. 13 depicts example monitoring system.

FIG. 13 illustrates a monitoring system 1300. Antenna 250 and transmitter 260, which are described herein, are shown. Also shown is a monitor 1320 that can include electronic circuitry configured to monitor, among other things, environmental data, RF data, or the like. Monitor 1320 can be associated with the transmitter 260. For instance, each transmitter 260 can be associated with a monitor 1320. Monitor 1320 can be positioned in proximity of the transmitter 260, as described herein.

Environmental data can include one or more of temperature, atmospheric or barometric pressure, wind speed, wind direction, vibration (or motion), precipitation, humidity, UV levels, or the like. One or more sensors can be connected to or incorporated into the electronic circuitry of the monitor 1320 to facilitate the monitoring. For monitoring environmental data, the sensors can include one or more of temperature sensors, barometric pressure sensors, anemometers, moisture sensors, or the like.

Monitor(s) 1320 (and associated transmitter(s) 260) can be deployed, for instance, at weather or observation stations, which can be designed to forecast weather conditions (such as tornadoes hurricanes, earthquakes, avalanches, heavy rains, heat waves, cold temperatures, or the like). Operation of such advanced weather warning systems can be improved. As an example, existing tornado monitoring systems include observation stations that are spaced far apart from each other (such as, several miles apart) and communicate with one or more weather station over telephone landlines. Existing tornado monitoring systems can be ineffective and unreliable. Deployment of one or more monitors 1320 (and associated transmitters 260) at tornado monitoring observation stations can improve reliability and efficiency, among others.

RF data can include information related to one or more properties of electromagnetic waves, such as signal to noise ratio (SNR or SINR), received signal strength indicator (RSSI), reference signal receive power (RSRP), reference signal received quality (RSRQ), voltage standing wave ratio (VSWR), physical cell id (PCI)/pilot number (PN), electromagnetic energy (EME), electromagnetic radiation (EMR), or the like. Monitor 1320 can measure magnitude of a detected RF signal versus frequency within a frequency range. Monitor 1320 can include an antenna and receiver or transceiver circuitry for detecting RF signals. RF data collected by the monitor 1320 can be used to determine performance of antenna 250 associated with the transmitter 260 and the monitor 1320. For instance, monitored RF data can be provided to a network carrier or any other third party to facilitate monitoring of a network (such as a cellular network), analyze performance of the network, or the like. RF data can be used to determine one or more key performance indicators (KPIs) of one or more antennas 250 or the DAS in order to, for instance, optimize performance, tune the network, or the like. For example, one or more KPIs can include reception or transmission signal strength of an antenna, quality of the transmitted or received signal, or the like. Monitor 1320 can include any of the functionality of the antenna monitor 1180 as described herein.

Transmitter 260 can receive data obtained by the monitor 1320 via a wired or wireless connection. Transmitter 260 can transmit the data to the receiver via the antenna 250, as described herein. Data obtained by the monitor 1320 can be transmitted by the transmitter 260 in addition to or in place of antenna identifier. For example, data obtained by the monitor 1320 can be encoded together with antenna identifier and the encoded signal can be transmitted. For instance, as described herein, antenna identifier can be a signal transmitted at specific frequency. In such case, data obtained by the monitor 1320 can be transmitted on the specific frequency associated with the transmitter 260, such as encoded on a carrier signal or wave being transmitted at the specific frequency. Encoding on the carrier wave can be performed using encoding or modulation, such as amplitude modulation, frequency modulation, phase modulation, or the like. In some cases, the transmitter 260 can be programmed or otherwise configured (for example, by adjusting or programming the chipset) so that transmitted signal is a carrier wave allowing information of all types to be transmitted through the antenna back to the receiver where it can be collected and transmitted back to a remote computing device for monitoring, analytics, or the like.

In some cases, a controller 1310 can be interposed between the transmitter 260 and the monitor 1320. Controller 1310 can, among other things, provide power to the monitor 1320, communicate data between the transmitter 260 and monitor 1320, or the like. Transmitter 260 can provide power to the controller 1310. Controller 1310 can be connected to the transmitter 260 or monitor 1320 via a wired or wireless connection. For instance, the monitor 1320 can include a USB interface (or the like) over which power can be provided from the controller 1310 to the monitor 1320 and data can be exchanged between the controller 1310 and the monitor 1320. In some instances, controller 1310 can include an Arduino device (or another similar device). The controller 1310 can include a USB interface (or the like) for connecting to the transmitter 260. In some cases, monitor 1320 can include one or more of a USB spectrum analyzer available from Triarchy Technology (or another similar device) or USB weather data logger available from Davis Instruments (or another similar device). In some cases, functionality of the monitor 1320 can be incorporated into the transmitter 260 and the controller 1310 is not used.

One or more of the monitor 1320 or controller 1310 can be supported by the transmitter 260, such as attached to housing of the transmitter or enclosed by the housing. Monitoring and transmission of monitored data can be performed in real time or substantially in real time. Monitoring and transmission of monitored data can be performed periodically, for example, at the time the transmitter 260 transmits the antenna identifier.

In some cases, one or more transmitters 260 can transmit monitored data directly to the receiver (or a remote computing system) without using corresponding one or more antennas 250. For example, the receiver (or the remote computing system) can poll one or more transmitters 260 or one or more transmitters 260 can transmit monitored data to the receiver without having been polled. Monitored data can be transmitted to the receiver (or the remote computing system) via a wired or wireless connection (such as Bluetooth, Zigbee, WiFi, Z-Wave, or the like).

Figure 14:
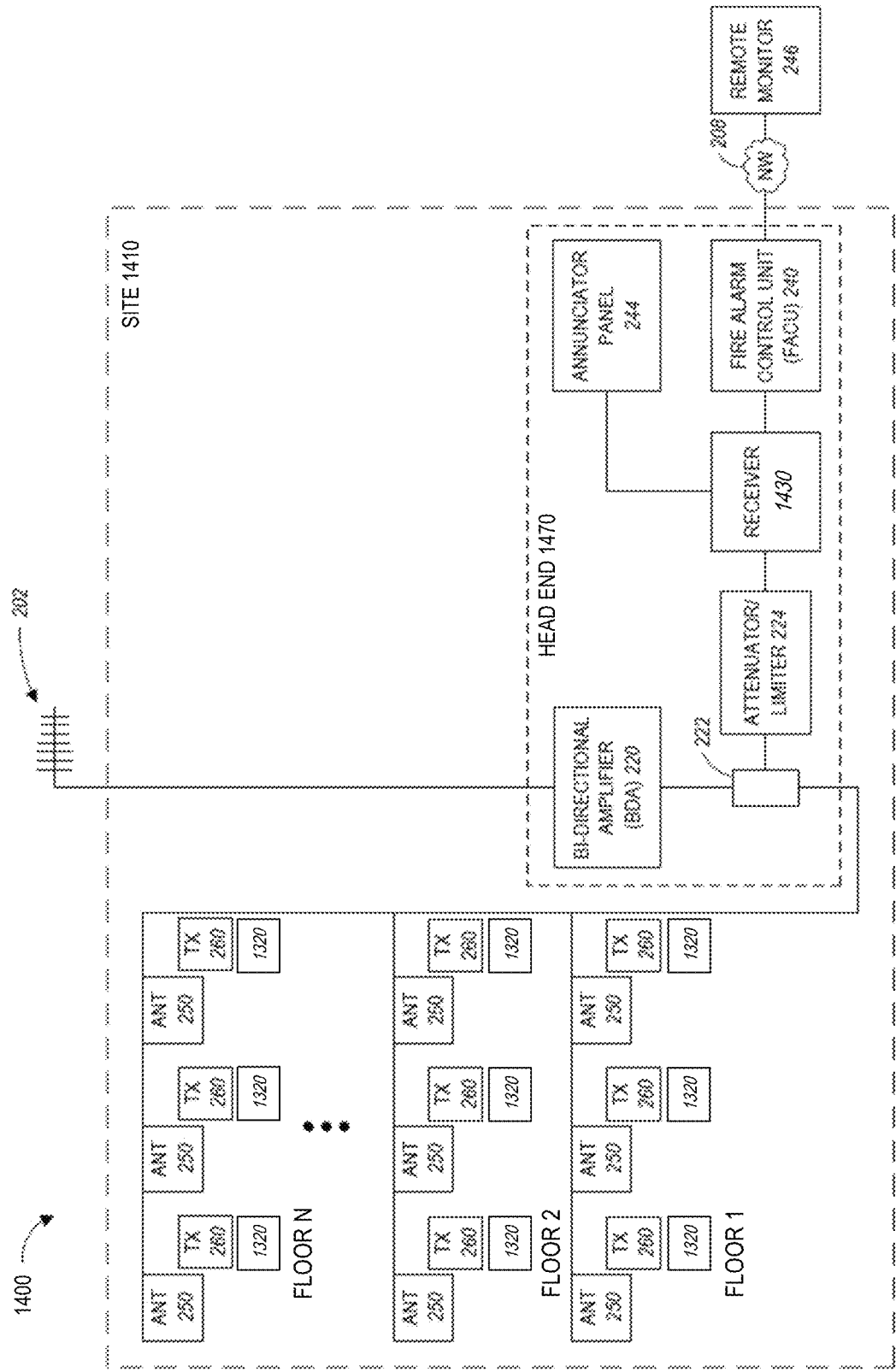
FIG. 14 depicts another example DAS.

FIG. 14 illustrates an example DAS 1400, which can be similar to any DAS described herein, such as DAS 200 of FIG. 2. The DAS 1400 is shown implemented at site 1410, which can be any indoor or outdoor location, as described herein. The DAS 1400 can be implemented in any building or venue whether indoor or outdoor. As illustrated, the DAS 1400 can include a plurality of transmitters 260, antennas 250, and a head end 1470. The head end 1470 can have one or more features of the head end 270 and/or any other head end described herein. The antennas 250 can be coupled by one or more cables or wires to a BDA 220 of the head end 1470, as described herein. As described herein, a plurality of monitors 1320 can be positioned in proximity to the transmitters 260 as shown in FIG. 14.

Data received by a receiver 1430 of the head end 1470 can include antenna identification and monitored data, as described herein. The receiver 1430 can include a processor and memory. The receiver 1430 can determine whether any of antenna identification is missing, as described herein. For example, the receiver 1430 can determine that identification associated with a particular antenna is missing in response to determining that a signal at a particular frequency corresponding to the particular antenna has not been received. Additionally or alternatively, the receiver 1430 can determine or identify monitored data. For example, the receiver 1430 can decode monitored data, such as, decode monitored data encoded on a carrier wave transmitted at a particular frequency. Monitored data can be one or more of processed, stored in memory, transmitted to a remote computing device(s) (not shown), or the like. Transmission of monitored data can be performed using a network, such as the network 208. One or more remote computing devices (for example, a network carrier) can perform monitoring, analytics, or the like.

In some cases, one or more of the transmitters 260 (or monitors 1320) can be configured to monitor and record proximity of a person to one or more antennas 250, transmitters 260, or monitors 1320. For example, Bluetooth protocol (or similar) can be used to detect presence of a computing device of the person (such as mobile computing device) in proximity to the one or more transmitters 260 (or monitors 1320). This can be used for determining locations visited by the person (and visiting times), which can assist with contact tracing or the like for limiting the spread of an infectious disease (such as coronavirus).

In some cases, one or more of the transmitters 260 (or monitors 1320) can be configured to partially or completely block any of the signals received or transmitted by any of the antennas 250. For example, one or more of the transmitters 260 (or monitors 1320) can generate an RF signal that may interfere with any of the signals received or transmitted by any of the antennas 250. This functionality may be used to block transmission of certain data from being transmitted by the DAS.

Additional Embodiments

The features of using a transmitter to monitor an antenna can be implemented in contexts other than a DAS. For instance, in a cellular network, a transmitter may be placed next to any antenna to monitor that antenna. Signals received from the transmitter by the antenna may be provided to a processor, either at the antenna or remote from the antenna. The processor can determine whether a signal is received or whether a signal of sufficiently high level is received. If not, the processor can output an indication that the antenna or an associated component in communication with the antenna (such as a coupler or cable) may not be functioning properly. More generally, a transmitter can be placed in proximity with any antenna to monitor the functionality of that antenna, including antennas used in radar or other applications.

The transmitter may also include software or firmware installed thereon, which may have a variety of possible different functions. The software or firmware may have a networking functionality (such as a network interface implementing the TCP/IP stack) that enables remote communication with the transmitter. Each transmitter may be wired or wirelessly connected to a remote system. A remote server, for instance, can provide administrator devices with network access to the transmitters. The remote server may deliver a web page or other graphical user interface to an administrative device, which user interface can enable an administrative device to remotely monitor a health of a transmitter (260) and/or its associated antenna (250). Remotely monitoring a transmitter and/or antenna may reduce the need for maintenance personnel to personally inspect transmitters and antennas.

Each transmitter may have a dynamic or static IP address, which can enable network communication with the transmitter. The user interface may indicate whether a transmitter has frozen or otherwise locked up. The user interface may provide an option for a user to select to restart a transmitter that has frozen or for any other reason. Upon user selection of this option, the remote server can transmit a command to the transmitter to power cycle or otherwise restart operation. In response, a hardware processor in the transmitter can perform a power cycle operation. The user interface may also output that a transmitter/antenna pair is no longer functioning in some way. By providing a remote power cycle option, the user interface may allow a user to determine whether the antenna or the transmitter is failing. If the transmitter/antenna pair continues to appear to not be functioning in the user interface, even after a power cycle, then the antenna or transmitter may have failed.

In another example, the receiver is network-enabled, and the remote server can communicate with the receiver to obtain the same information described above (for example, regarding component failures) instead of communicating individually with the transmitters.

Any of the transmitters disclosed herein can be powered from a central power supply. One or more wires can connect any of the transmitters to the central power supply. Existing wiring (for example, as shown in FIG. 2) can be used to supply power to any of the transmitters.

Any one or more features of the monitoring systems and methods disclosed herein can be applied in the context of monitoring at least a portion of a FirstNet public safety network ("FirstNet network"). FirstNet network is designed to be an interoperable, high-speed broadband network that provides a single interoperable platform for law enforcement, firefighters, paramedics, and other public safety personnel across the United States. FirstNet network is designed to connect radio access networks of each state to a network core.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," "include," "including," "having," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

These and other changes can be made to the inventions in light of the above Detailed Description. While the above description describes certain examples of the inventions disclosed herein, and describes the best mode contemplated, no matter how detailed the above appears in text, the inventions can be practiced in many ways. Details of the system may vary considerably in its specific implementation, while still being encompassed by the inventions disclosed herein. As noted above, particular terminology used when describing certain features or aspects of the inventions should not be taken to imply that the terminology is being redefined herein to be restricted to any specific characteristics, features, or aspects of the inventions with which that terminology is associated.

Any claims intended to be treated under 35 U.S.C. § 112 (f) will begin with the words "means for", but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. An antenna monitoring system comprising:
   a plurality of transmitters associated with a plurality of antennas, the plurality of transmitters being configured to:
   collect environmental data; and
   transmit a first plurality of signals and the environmental data to the plurality of antennas, a signal of the first plurality of signals comprising an antenna identifier for an antenna associated with a transmitter transmitting the signal; and
   a receiver comprising an electronic processing circuitry configured to: receive a second plurality of signals from the plurality of antennas, the second plurality of signals transmitted by the plurality of antennas in response to the first plurality of signals and the environmental data being transmitted to the plurality of antennas by the plurality of transmitters;
   determine from the second plurality of signals a plurality of antenna identifiers and the environmental data;
   determine that the plurality of antenna identifiers does not include a first antenna identifier for a first antenna of the plurality of antennas; and
   in response to determining that the plurality of antenna identifiers does not include the first antenna identifier for the first antenna, output an indication corresponding to a failure of the first antenna.

2. The antenna monitoring system of claim 1, wherein the environmental data comprises at least one of temperature or humidity.

3. The antenna monitoring system of claim 1, wherein the plurality of transmitters are configured to collect radio frequency (RF) signal data and transmit the first plurality of signals, the environmental data, and the RF signal data to the plurality of antennas.

4. The antenna monitoring system of claim 3, wherein the receiver utilizes at least one of the environmental data or the RF signal data for one or more of monitoring or analytics.

5. The antenna monitoring system of claim 3, wherein the RF signal data comprises one or more properties of RF signals received or transmitted by an antenna of the plurality of antennas.

6. The antenna monitoring system of claim 1, wherein a transmitter of the plurality of transmitters is configured to encode as encoded data a signal comprising an antenna identifier for an antenna associated with a transmitter and the environmental data, and wherein the transmitter is configured to transmit the encoded data to the antenna.

7. The antenna monitoring system of claim 6, wherein the receiver is configured to decode a second signal from the second plurality of signals to determine the signal comprising the antenna identifier and the environmental data.

8. The antenna monitoring system of claim 1, wherein a transmitter of the plurality of transmitters is configured to detect presence of a computing device being in proximity with the transmitter to track movements of the computing device.

9. The antenna monitoring system of claim 1, wherein the electronic processing circuitry of the receiver is configured to distinguish between the first antenna identifier for the first antenna and a second antenna identifier of a second antenna of the plurality of antennas.

10. The antenna monitoring system of claim 9, wherein the electronic processing circuitry of the receiver is configured to:
    determine that the plurality of antenna identifiers does not include the second antenna identifier for the second antenna of the plurality of antennas; and
    in response to determining that the plurality of antenna identifiers does not include the second antenna identifier for the second antenna, output an indication corresponding to a failure of the second antenna.

11. The antenna monitoring system of claim 1, wherein the electronic processing circuitry of the receiver is configured to output the indication to at least one of a display, a fire alarm control unit, an annunciator panel, or a remote computing system.

12. An antenna monitoring method comprising:
    by a plurality of transmitters:
        collecting environmental data; and
        transmitting a first plurality of signals and the environmental data to a plurality of antennas associated with the plurality of transmitters, a signal of the first plurality of signals comprising an antenna identifier for an antenna associated with a transmitter transmitting the signal; and
    by a receiver:
        receiving a second plurality of signals from the plurality of antennas, the second plurality of signals transmitted by the plurality of antennas in response to the first plurality of signals and the environmental data being transmitted to the plurality of antennas by the plurality of transmitters;
        determining from the second plurality of signals a plurality of antenna identifiers and the environmental data; and
        at a first time:
            determining that the plurality of antenna identifiers does not include a first antenna identifier for a first antenna of the plurality of antennas; and
            in response to determining that the plurality of antenna identifiers does not include the first antenna identifier for the first antenna, outputting an indication corresponding to a failure of the first antenna.

13. The antenna monitoring method of claim 12, wherein the environmental data comprises at least one of temperature or humidity.

14. The antenna monitoring method of claim 12, further comprising:
    by the plurality of transmitters, collecting radio frequency (RF) signal data and transmitting the first plurality of signals, the environmental data, and the RF signal data to the plurality of antennas, wherein the RF signal data comprises one or more properties of RF signals received or transmitted by an antenna of the plurality of antennas.

15. The antenna monitoring method of claim 14, further comprising:
    by the receiver, utilizing at least one of the environmental data or the RF signal data for one or more of monitoring or analytics.

16. The antenna monitoring method of claim 12, further comprising:
    by a transmitter of the plurality of transmitters, encoding as encoded data a signal comprising an antenna identifier for an antenna associated with the transmitter and the environmental data and transmitting the encoded data to the antenna.

17. The antenna monitoring method of claim 16, further comprising:
    by the receiver, decoding a second signal from the second plurality of signals to determine the signal comprising the antenna identifier and the environmental data.

18. The antenna monitoring method of claim 12, further comprising:
    by a transmitter of the plurality of transmitters, detecting presence of a computing device being in proximity with the transmitter to track movements of the computing device.

19. The antenna monitoring method of claim 12, further comprising:
    by the receiver, distinguishing between the first antenna identifier for the first antenna and a second antenna identifier of a second antenna of the plurality of antennas.

20. The antenna monitoring method of claim 19, further comprising, by the receiver:
    at a second time:
        determining that the plurality of antenna identifiers does not include the second antenna identifier for the second antenna of the plurality of antennas; and
        in response to determining that the plurality of antenna identifiers does not include the second antenna identifier for the second antenna, outputting an indication corresponding to a failure of the second antenna.

21. The antenna monitoring method of claim 12, wherein outputting the indication corresponding to the failure of the first antenna comprises outputting the indication to at least one of a display, a fire alarm control unit, an annunciator panel, or a remote computing system.

* * * * *